(12) United States Patent  
Davis et al.

(10) Patent No.: US 7,818,290 B2  
(45) Date of Patent: Oct. 19, 2010

(54) SYSTEM TO ASSOCIATE A DEMOGRAPHIC TO A USER OF AN ELECTRONIC SYSTEM

(75) Inventors: Charles Frederick Lee Davis, Richland, WA (US); Michael Patrick Schmidt, Pasco, WA (US); Herbert Lewis Alward, Coeur d'Alene, ID (US)

(73) Assignee: Identity Metrics, Inc., Aliso Viejo, CA (US)

( * ) Notice: Subject to any disclaimer, the term of this patent is extended or adjusted under 35 U.S.C. 154(b) by 0 days.

(21) Appl. No.: 11/818,921

(22) Filed: Jun. 14, 2007

(65) Prior Publication Data

US 2008/0091639 A1 Apr. 17, 2008

Related U.S. Application Data

(60) Provisional application No. 60/813,584, filed on Jun. 14, 2006, provisional application No. 60/813,663, filed on Jun. 14, 2006.

(51) Int. Cl.  
*G06F 17/30* (2006.01)

(52) U.S. Cl. ........................... 707/603; 707/703

(58) Field of Classification Search ............... 707/603, 707/703  
See application file for complete search history.

(56) References Cited

U.S. PATENT DOCUMENTS

| 4,621,334 | A |  | 11/1986 | Garcia |
| 4,805,222 | A |  | 2/1989 | Young et al. |
| 5,343,529 | A |  | 8/1994 | Goldfine et al. |
| 5,386,103 | A |  | 1/1995 | DeBan et al. |
| 5,870,723 | A |  | 2/1999 | Pare, Jr. et al. |
| 6,006,188 | A |  | 12/1999 | Bogdashevsky et al. |
| 6,012,052 | A | * | 1/2000 | Altschuler et al. ............. 707/2 |
| 6,151,593 | A |  | 11/2000 | Cho et al. |
| 6,173,260 | B1 |  | 1/2001 | Slaney |
| 6,298,348 | B1 |  | 10/2001 | Eldering |
| 6,442,692 | B1 |  | 8/2002 | Zilberman |

(Continued)

FOREIGN PATENT DOCUMENTS

EP 1255392 11/2002

OTHER PUBLICATIONS

Bandi, K.R. and Srihari, S.N. "Writer Demographic Classification Using Bagging and Boosting", Proc. International Graphonomics Society Conference (IGS), Jun. 2005, Salerno, Italy, pp. 133-137.

(Continued)

*Primary Examiner*—Neveen Abel Jalil  
*Assistant Examiner*—Son T Hoang  
(74) *Attorney, Agent, or Firm*—Tsircou Law, P.C.

(57) ABSTRACT

This invention includes a system for the association of a user of an electronic system with a demographic, wherein a data characteristic of the user is accessed and compared to a wide population probability distribution reference indicative of a demographic associated with the data characteristic, and making a determination of a probability that the user is up to the demographic based on the comparing. Systems may include a method for selecting a more probable data characteristic upon which to associate a user with a demographic, and a data processing apparatus configured with one or more wide population probability distribution references for use on any one of a number of electronic systems.

18 Claims, 17 Drawing Sheets

U.S. PATENT DOCUMENTS

| | | | |
|---|---|---|---|
| 6,553,494 | B1 | 4/2003 | Glass |
| 6,938,159 | B1 | 8/2005 | O'Connor et al. |
| 6,957,185 | B1 | 10/2005 | Labaton et al. |
| 2001/0004733 | A1* | 6/2001 | Eldering ............... 705/14 |
| 2002/0095586 | A1 | 7/2002 | Doyle et al. |
| 2002/0112171 | A1 | 8/2002 | Ginter et al. |
| 2002/0129368 | A1* | 9/2002 | Schlack et al. ............ 725/46 |
| 2003/0065595 | A1* | 4/2003 | Anglum ............... 705/35 |
| 2003/0074201 | A1 | 4/2003 | Grashey et al. |
| 2004/0015714 | A1* | 1/2004 | Abraham et al. ......... 713/200 |
| 2004/0034558 | A1* | 2/2004 | Eskandari ............. 705/10 |
| 2005/0008148 | A1 | 1/2005 | Jacobson |
| 2007/0011039 | A1* | 1/2007 | Oddo ................. 705/10 |

OTHER PUBLICATIONS

Cottrell, G.W. and Matcalfe, J. "EMPATH: Face, Emotion, and Gender Recognition using Holons", Proc. 1990 Conf. Advances Neural Information Processing Systems, 1990, Denver, Colorado, pp. 564-571.

Golomb, B.A.; Lawrence, D.T.; and Sejnowski, T.J. "SexNet: A Neural Network Identifies Sex from Human Faces", Proc. 1990 Conf. Advances Neural Information Processing Systems, 1990, Denver, Colorado, pp. 572-577.

Gunetti, D. et al.; "Keystroke Analysis of Free Text" ACM Transactions on Nformation and System Security, vol. 8, Aug. 2005, pp. 312-347.

Han, J.Y.; "Low-Cost Multi-Touch Sensing through Frustrated Total Internal Reflection" UIST '05, Oct. 2005, Seattle, ACM, pp. 115-118.

Henniger, O.; Schneider, B.; Struif, B.; and Waldmann, U. "Improving the Binding of Electronic Signatures to the Signer by Biometric Authentication", Advances in Biometrics: International Conference, Hong Kong, China, 2006, pp. 523-530.

Lu, X.; Chen, H.; and Jain, A. K. "Multimodal Facial Gender and Ethnicity Identification", Advances in Biometrics: International Conference, Hong Kong, China, 2006, pp. 554-561.

Monrose, F. et al. "Password hardening based on keystroke dynamics," Proceedings of 6th ACM Conference on Computer and Communications Security CCCS 1999.

Obaidat, M.S. and Sadoun, B. "Keystroke Dynamics Based Identification," in Biometrics: Personal Identification in Networked Society, Anil Jain et al., editors, Kluwer, MA. 1998. pp. 213-229.

Pusara, M. and Brodley, C.E., "User ReAuthentication via Mouse Movements" in Proceedings of the 2004 ACM Workshop on Visualization and Data Mining for Computer Security, ACM, New York, NY, pp. 1-8.

Sato, Y. and Kogure, K. "On-line Signature Verification. Based on Shape, Motion, and Writing Pressure", Proc. 6th Int. Conf. on Pattern Recognition, pp. 823-826, 1982.

The Electronic Signatures in Global and National Commerce Act (ESIGN, Pub.L. 106-229, 14 Stat. 464, enacted Jun. 30, 2000, 15 U.S.C. ch.96).

Yun, M.H. et al. "Classification of Bluffing Behavior and Affective Attitude from Prefrontal Surface Encephalogram During On-Line Game" Advances in Biometrics: International Conference, Hong Kong, China, 2006, pp. 562-570.

"SecurID Token", http://www.is.mcgill.ca/minerva/Security/securid_token.htm, (Jun. 3, 2003).

"Baye's Theorem—Wikipedia", http://web.archive.orglweb/20031204023001/http://en.wikipedia.orglwikilBayes'_theorem.

* cited by examiner

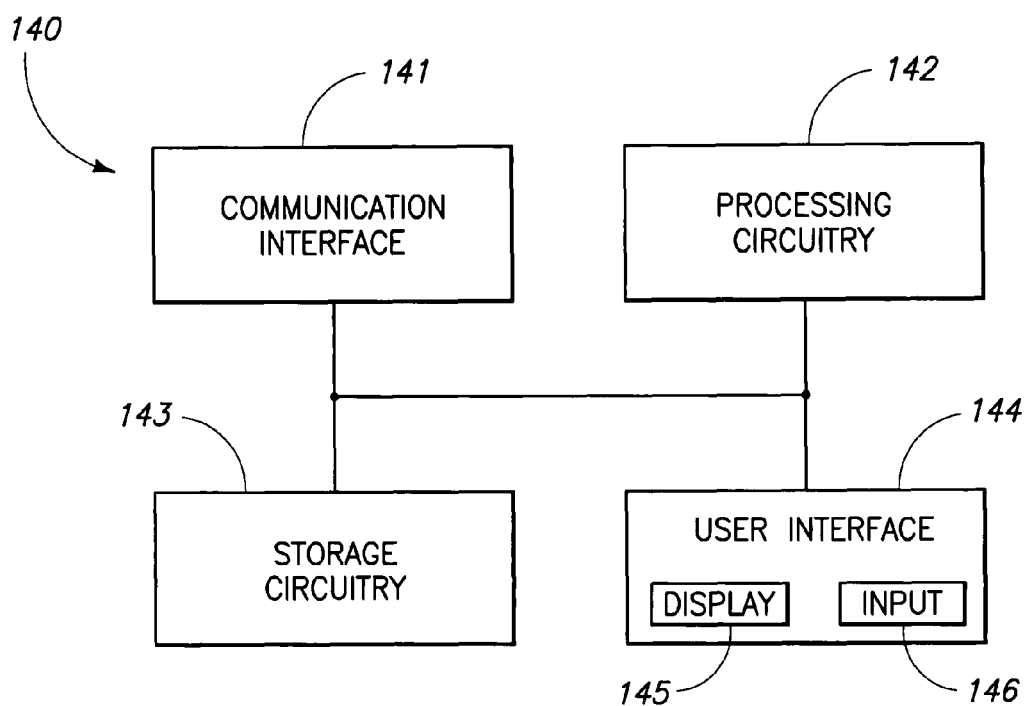
F I G. 4

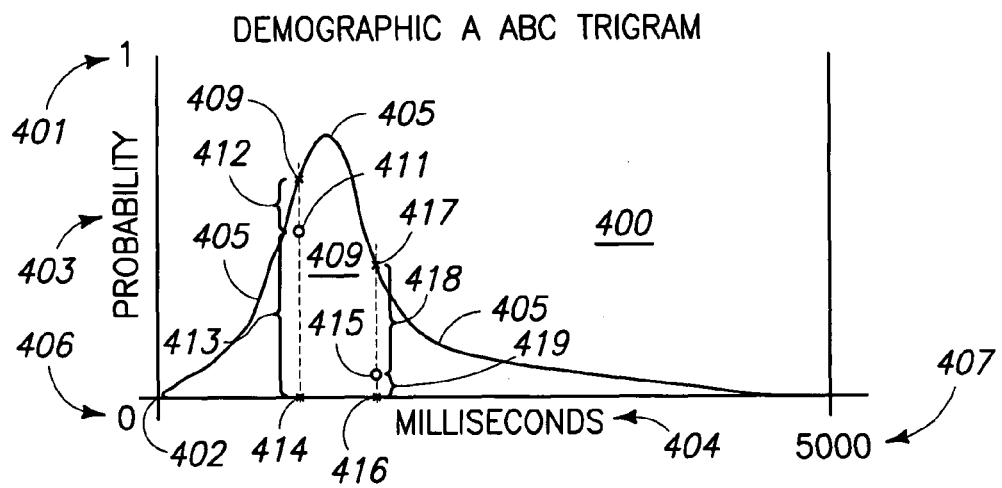
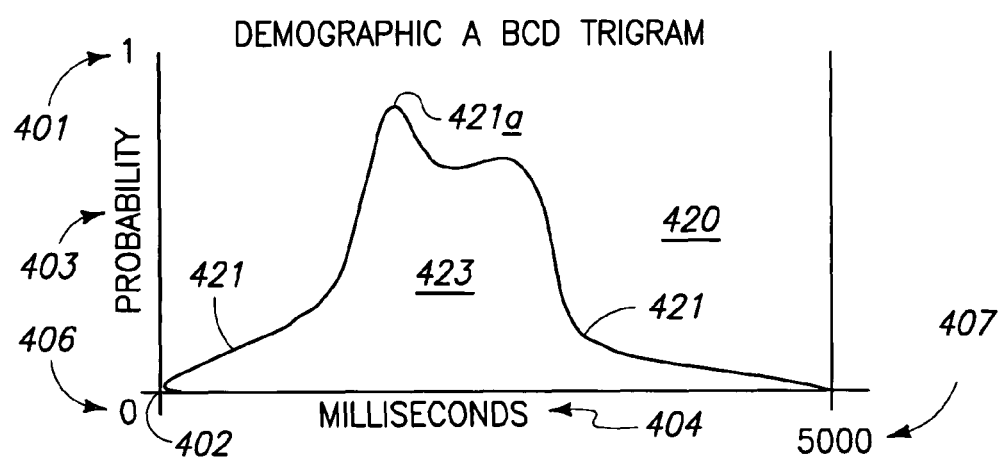

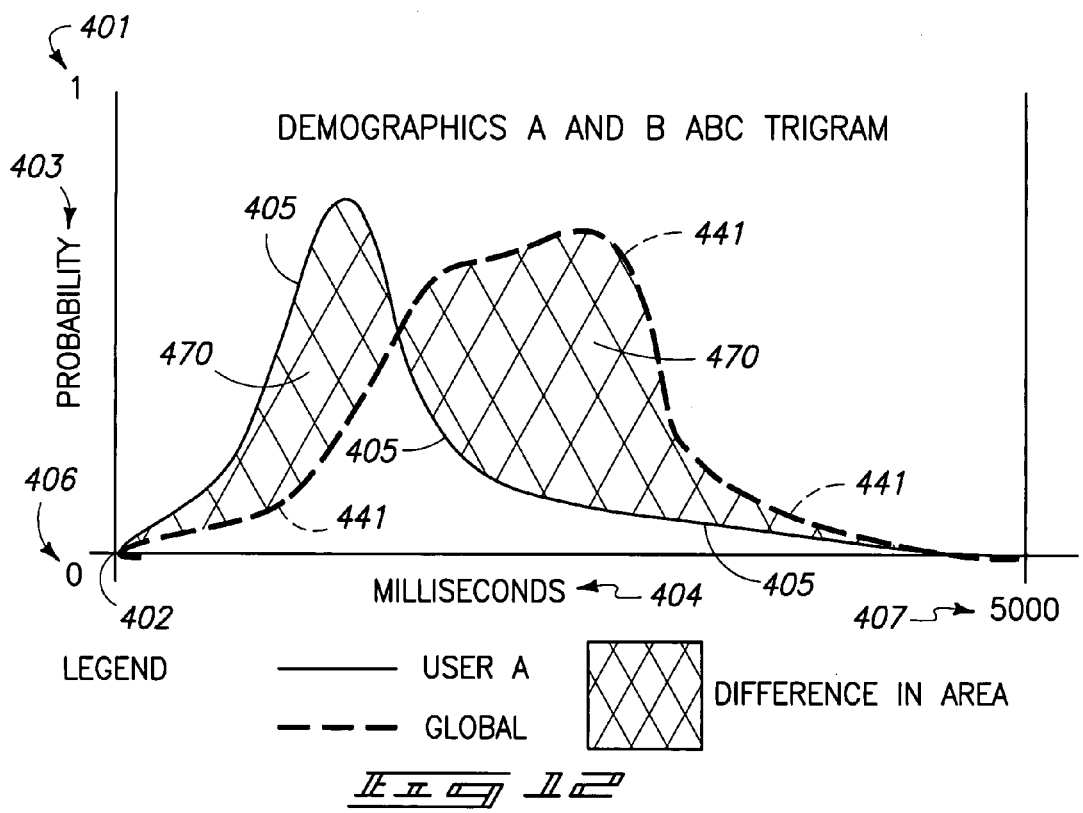
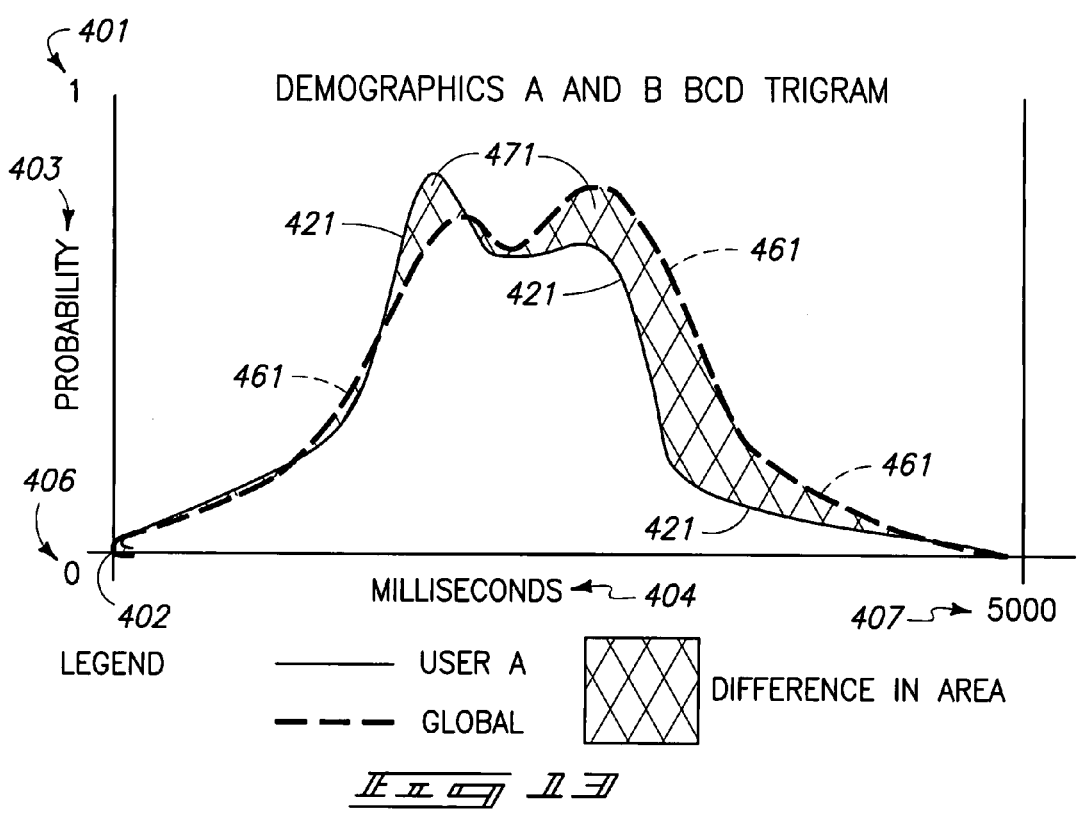

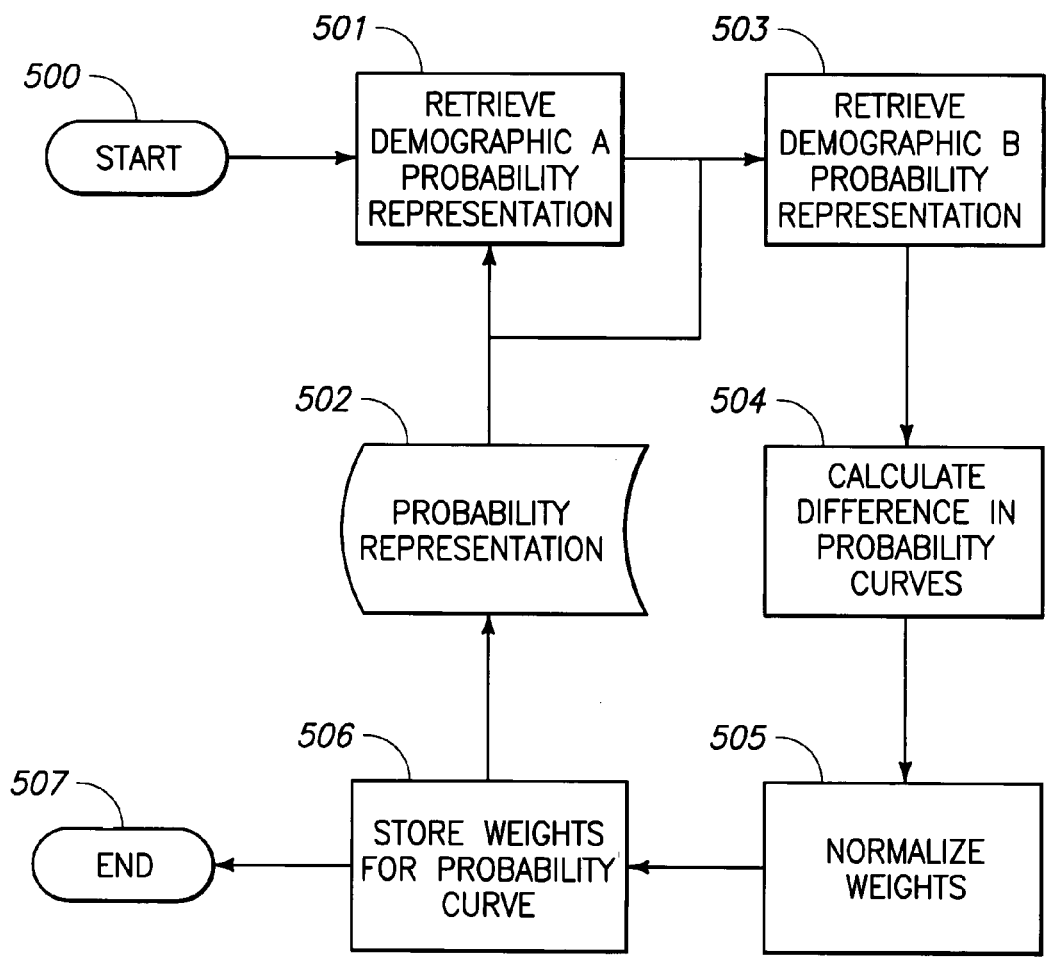

SYSTEM TO ASSOCIATE A DEMOGRAPHIC TO A USER OF AN ELECTRONIC SYSTEM

CROSS REFERENCE TO RELATED APPLICATION

This application claims priority from the following applications: (1) U.S. provisional patent application No. 60/813,584, filed Jun. 14, 2006, confirmation number 4905, entitled "Adaptive Method for Monitoring Keyboard Dynamics to Establish User Demographic Information in Real Time", by inventors Charles Frederick Lee Davis, Richland, Wash., Michael Patrick Schmidt, Pasco, Wash., and Herbert Lewis Alward, Coeur d'Alene, Id.; and (2) U.S. provisional patent application No. 60/813,663, filed Jun. 14, 2006, confirmation number 4677, entitled "Adaptive Method for Monitoring Mouse Dynamics to Establish User Demographic Information in Real Time", by inventors Charles Frederick Lee Davis, Richland, Wash., Michael Patrick Schmidt, Pasco, Wash., and Herbert Lewis Alward, Coeur d'Alene, Id. The above-referenced U.S. provisional patent applications are hereby incorporated herein by this reference as though fully set forth herein, including specification and drawings.

TECHNICAL FIELD

This invention relates to a system for determining a probability that an individual user of a system is within a demographic group. More particularly, this invention utilizes data from keyboard or similar devices and/or from X-Y devices such as a computer mouse or a touch pad, to provide ongoing demographic information to be compared with wide population probability distribution references, to determine a probability that the user is in a demographic group, and then to store the demographic information for later use.

BACKGROUND OF THE INVENTION

Many devices and systems use a keyboard or similar terminal as a user interface to access the device or system. Keyboard terminals are generally hardware devices or user interfaces that emulate typewriters, but they are also keypads on cellular telephones, portable devices such as PDA's and touch screen devices, tablet computers, or other devices that use a touch screen for key entry. These types of devices with the user interfaces may for example be a computer or electronic machine that generally requires any type of input such as alphanumeric input, but keyboards are not restricted to having alphanumeric keys.

On keyboards for example, statistical dynamics of the keyboard typing, entry or input are generally unique to the user. Therefore, the dynamics of the keyboard may provide a statistical signature of the user at the human-device interface in a real time, continuous fashion as long as the user is using the keyboard.

In addition to keyboard dynamics, another way to identify or associate demographics or demographic information of clients or users is to track the user's behavior patterns while using an X-Y device such as a computer mouse or touch pad. A mouse for a computer is an input device that translates the position of a tracking ball to the position of the pointer on the computer display screen. Generally, a computer mouse uses a tracking ball or other location tracker, but other kinds of a mouse exist as touch pads, touch screens, joysticks or such a device that yields an x,y or x,y,z coordinate on a computer display screen. How the mouse is used and its placement is demographic specific due to the user's length of fingers, hands, arms and body position when using a mouse. When X-Y device activity occurs such as mouse activity, user demographic information can be identified by comparing the current mouse activity to a stored mouse activity pattern associated with demographic groups.

Information indicates that the keyboard dynamics and X-Y device dynamics of a user may be related to the age, sex, left-right handedness, level of education, etc. of the user. When accessing these electronic devices, the keyboard dynamics then yields demographic information about the user without the knowledge of the user. A statistical probability for each demographic element can be mapped to keyboard dynamics.

In prior systems, keyboards dynamics have been used as a signature to a user. In this invention, keyboard dynamics serve as a signature for demographic groups. Collecting the demographic information via keyboard dynamics allows businesses to determine their customer demographic with much less labor and material cost and with the benefit of not requiring the customer to complete onerous, lengthy questionnaires. The use of probability distribution references provides a fast, adaptable, scalable method for identifying the demographic group of users.

Obtaining, collating and understanding the demographics of clients or users is a desired element to the marketing efforts of any business. Businesses spend substantial time and money on collecting and analyzing demographic data on customers or potential customers, as well as on who accesses their business websites. Traditional means of collecting demographic data consist of requesting customers to complete questionnaires in order to obtain their contact information and/or their demographic information. These questionnaires may for instance be associated with registering products with warranty information. These means, however, have proven to be expensive and not entirely accurate, since there is no means to prevent the customer from completing the questionnaire with false information.

Information is available to suggest that the X-Y device dynamics of a user may be related to the age, sex, left-right handedness, level of education, etc. of the user, such as the user of a computer mouse, a track ball, a touch pad, etc. When accessing these electronic devices, the X-Y device dynamics then yields demographic information about the user without the knowledge of the user. A statistical probability for each demographic element can be mapped to X-Y device dynamics.

An object of some aspects of this invention is to provide a relatively fast and adaptable system for associating a demographic with a user of a keyboard or an X-Y device such as a computer mouse, including an anonymous or an unidentified user. The monitoring and/or sensing of keyboard related dynamics or X-Y device dynamics provides a non-intrusive way to provide such a system or mechanism. The probability distribution references used to produce the demographic data, signatures or profiles may be utilized in embodiments of this invention to provide a scalable way to associate or identify the selected demographic of the user, including the anonymous user. In aspects of this invention, the probability distribution references (which may be a probability table in one aspect of the invention), provide for the scaling of potentially very large volumes or amounts of data, relative to $O(1)$ number of users. This probability distribution reference may later be trained on an ongoing basis, and may therefore be utilized to provide a single comparison reference against which to compare new data to be compared for identification with a demographic. Other keyboard dynamic methods scale to n or $n^2$ number of users.

It is also an object of some embodiments of this invention to provide a system which identifies demographics of an anonymous or unidentified user (anonymous or unidentified in the sense of the demographics of the user and/or the user personal and contact information), including identifying more unique metrics, data points, characteristics or attributes of demographic groups.

While the invention was motivated in addressing some objectives, it is in no way so limited. The invention is only limited by the accompanying claims as literally worded, without interpretative or other limiting reference to the specification, and in accordance with the doctrine of equivalents.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

FIG. 4 is a block diagram of an exemplary data processing apparatus;

FIG. 8 is a graphic representation of one embodiment of a probability distribution representation for keystroke timings of users within a demographic A typing the keystroke combination of ABC;

FIG. 9 is a graphic representation of one embodiment of a probability distribution representation for keystroke timings of users within a demographic A typing the keystroke combination of BCD;

FIG. 12 is a graphic representation of the probability distribution representations illustrated in FIGS. 8 and 10 combined for comparing and illustration;

FIG. 13 is a graphic representation of the probability distribution representations illustrated in FIGS. 9 and 11 combined for comparing and illustration;

FIG. 14 is an example of an embodiment of a flowchart that may be utilized in aspects of this invention illustrating one possible sequence for constructing a biased scoring system using a characteristic data of a demographic;

DETAILED DESCRIPTION OF THE PREFERRED EMBODIMENTS

Figure 1:
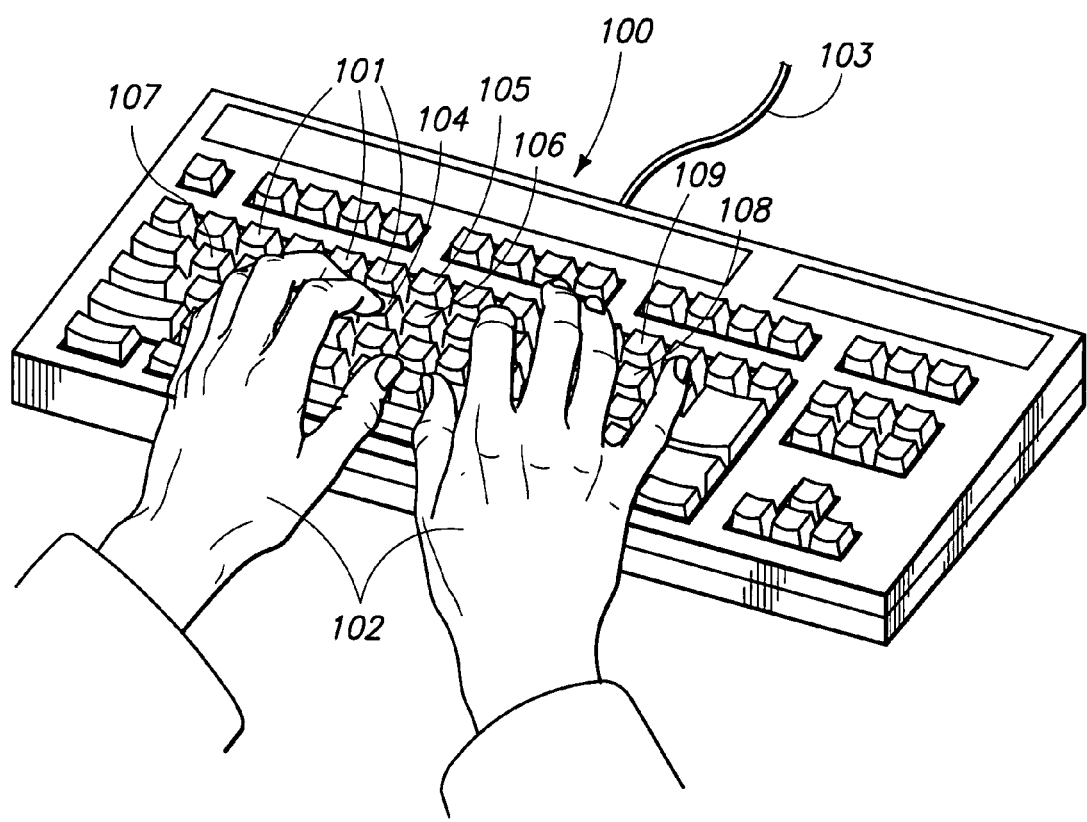
FIG. 1 is a perspective view of a user keying on a traditional keyboard.

The term "data" as used herein may be any individual or group of data, data points or items, from any one of a number of sources and may be any one of a number of different types of data. Data for example may be a sensed data or grouping of individual data points, or a measurement of most anything that can be measured, preferably related to behavior or distinguishing characteristics. Some examples of data may include information, parameters, keystroke dynamics, X-Y device dynamics, events, characteristics, facial movement, eye movement, facial profile, data points, groups of data points or characteristics, inputs, signals, etc.

When the term "accessing" is used in connection with accessing data, accessing characteristics or accessing other items, it is not limited to accessing data or information from outside the processor, but instead would include all such items accessed within the data processing apparatus or system, or external to the data processing apparatus.

It will also be appreciated by those of ordinary skill in the art that data may also be a grouping or combination of any of the foregoing. As one example, data points from keystroke dynamics from a user typing keys, and keyboard or key-based interfaces, the timing of keying of keystrokes or keystroke combinations, may be measured for example for a series of keystrokes such as typing the keys ABC or BCD. This would be an n-gram where n is three.

In some aspects of this invention, data is obtained by taking measurements from an X-Y device, for example measuring the speed at which a user moves a computer mouse, or the location area where a user tends to leave the computer mouse in the rest position, or the trajectory which the user tends to follow in moving a computer mouse (or the user's finger on a touchpad input device to electronic system, or on a tablet computer). Another example may be wherein data such as the pressure which a user asserts on a tablet computer user interface (e.g. a screen), which in some examples includes sensing pressure on a scale of zero to fifty-six.

The phrase "probability distribution representation" may be a behavioral record which may, but need not be, related to frequency of an identified behavior, component of behavior, measurement of behavior or other data point. It will be recognized by those of ordinary skill in the art that these tables may come in numerous shapes, forms, configurations, scales and may include singular measurements, groupings of measurements, groupings of data, any other individual data or data points or items, which may provide identifying information for comparison, or for distinguishing a particular identified or authorized user. Examples of probability distribution representations may be probability tables, histograms, bar graphs, frequency records, event counts, profiles, records, lookup tables, probability lookup tables, behavioral profiles, bar graphs, distribution functions, or others, all within the contemplation of this invention. There may be different ways to visually represent a probability distribution representation, such as more as a bar chart, curve, smoothed curve, series of data points represented graphically, a histogram or others, with no one in particular being required to practice this invention. Known techniques may be utilized to create or smooth or alter the curve and/or data representation.

When the term or phrase "authorized user" is used herein, it means not only a single user, but may also include a class, group or demographic of users all within the meaning of the phrase "identified user". For example, it may include persons within an accounting group at a corporation who have access to a computer or electronic system or network; or it may include a group of people classified together because they are all left-handed, wherein this invention is not limited to any one in particular.

The term "global" in relation to a probability distribution reference or references may also be referred to as a wide population reference, for which there is no particular number or quantity of data points blended, but which will depend upon the circumstances. In most if not all cases the wide population data will include more than a sample of one since the one data point would be from the current purported authorized user.

Embodiments of this invention may provide a desired advantage of being more scalable than other systems, in that substantial or even massive amounts of data, characteristics, information or other measurable input data may be incorporated into one or more probability distribution representations or histograms to provide a single or a small number of probability distribution representations against which to compare the new information with. This means that massive information such as gathered over the World Wide Web or Internet may be distilled into one or relatively few probability distribution representations against which the data can be quickly compared to determine if it is more probable than not that the purported authorized user, is in fact the authorized user. The system designer adapting embodiments of this invention to a given application will have many options in determining what type of probability distribution representation to construct, the data to best distinguish the distinguishing characteristic, and further in defining the universe of data that may be combined to comprise the probability distribution representation, to optimize the ability to distinguish a user, or to authenticate the authorized user.

Embodiments of this invention are methods and apparatus configured to receive, which may in some examples mean a system is configured to receive, collect, capture, sense or parse data, and then to process or utilize said data as further described herein.

The present invention defines an adaptive, scalable method to acquire a behavioral signature for a user of a system with a keyboard by tracking the pattern of keyboard dynamics made by the user and associating their demographic information to the signature. Similar groupings of demographic groups provide demographic information regarding an anonymous or unknown user, or of a user whose desired demographics are not known.

As fingerprints identify a person, so too do the keyboard devices render an identifiable signature related to the keyboard dynamics such as the typing of the keys. The signature is the pattern with which the user places entries using the keyboard, which consists of, among other data, the measuring the hold time of keys, the timing of keystrokes and any other measurable data or characteristic. The pattern is different for each individual due to the relationship between the timing of keystrokes between keys and to the length of their arms, fingers, size of arm and finger strength and familiarity with the keyboard. For example, users would have different timing between keys "a" and "x" on a Standard English keyboard. The set of the differences between the keys yields a robust set of keystroke relationships for determining the probability that a particular user is at a keyboard. The pattern of timing between the keys then becomes the signature for the user.

This invention establishes measurements and places probability profiles on the keyboard dynamics of any chosen n-gram measurement. The measurements can pertain to, but are not limited to such characteristics as the hold time of a keystroke, the timing between keystrokes, or the total time to produce an n-gram measurement of keystrokes. The n-gram measurement can be a single key, or two keys up to n keys to acquire the measurement. For example, a trigraph would capture sets of three keys to determine the measurement. From the keystrokes, user probability distribution representations and global probability distribution representations are assembled or constructed.

Demographic profiles can be established and monitored using keyboard dynamics, X-Y device dynamics, or other devices. For instance, the handedness, the sex, the weight, the level of education, etc. can be the demographics under consideration. The global or wide population probability may also comprise the negative set of the demographic element. For instance, if handedness was under consideration, the left-handed probability distribution representation would yield the likelihood the user is left-handed and the impostor table would then be the right-handed probability distribution representation, which will yield the likelihood that the user is right-handed. A perfectly ambidextrous person would theoretically yield a likelihood of 0.50 in both probability distribution representations. Once the probability distribution representations are trained for a demographic, the system monitors the demographics of the anonymous users, or of users whose desired demographic is not known. For the anonymous nature of Internet websites for example, this invention allows the collecting of demographics without intrusive questionnaires.

To establish the probability profile of a user demographic element, the system captures the keyboard events and the frequency of the keyboard events produced by a left-handed typist and stores the results. Table 1 illustrates an example event table for a trigraph. The system stores the three successive keys as a timing event in milliseconds and the corresponding frequency of occurrence. These measurements then yield the demographic typing profile.

TABLE 1

Trigraph user timing events of keystroke collections for a left-handed person.

| Left-handed Trigraph | Time (milliseconds) | | | | | | | |
|---|---|---|---|---|---|---|---|---|
| ABC | 0 | 100 | 101 | 102 | ... | 450 | ... | 5000 |
| frequency | 0 | 4 | 0 | 2 | ... | 50 | ... | 0 |
| BCD | 0 | 100 | 101 | 102 | ... | 320 | ... | 5000 |
| frequency | 0 | 2 | 1 | 5 | ... | 35 | ... | 0 |

Once the system sufficiently captures the demographic keyboard dynamic profile, the system calculates the demographic element probability distribution representation by applying a general kernel function, $K_h(x)$, which smoothes the measured data into a density estimator, given by:

$$K_h(x) = 1/h\ K(x/h),$$

where h=bandwidth and
K=Uniform, Triangle, Quartic, Gaussian, Cosinus, or etc. kernel function.

The parameter, h, determines the smoothness of the estimation. When h approaches zero (h→0), the kernel estimation is less smooth, and when h approaches infinity (h→∞), the kernel estimation is very smooth. The kernel function, K, can be any kernel estimation function where the $\int K(x)dx=1$. Table 2 illustrates the calculation of the likelihood for each keyboard event with respect to a left-handed person. Once trained for a demographic element, when a keyboard event occurs, the system returns the likelihood value for that demographic element.

TABLE 2

Left-handed probability distribution representation.

| Left-handed Trigraph | Time (milliseconds) | | | | | | | |
|---|---|---|---|---|---|---|---|---|
| ABC | 0 | 100 | 101 | 102 | ... | 450 | ... | 5000 |
| Likelihood | 0.00 | 0.02 | 0.01 | 0.01 | ... | 0.26 | ... | 0.00 |
| BCD | 0.00 | 100 | 101 | 102 | ... | 320 | | 5000 |
| Likelihood | 0.00 | 0.01 | 0.01 | 0.02 | ... | 0.20 | ... | 0.00 |

To make the probability distribution representation more adaptive, more parameters and training can be tied to the probability distribution representation, such as time of day or type of application. The size of the user probability needs only to be as large as the typing key space for the user.

To establish the probability profile or probability distribution reference for the negative set of a demographic element, the system may establish a global or wide population probability distribution representation which stores the probability profile of the other possibilities of demographic choices. For left-handedness the global probability distribution representation would be the probability distribution representation for right-handedness people and visa-versa for right-handedness. As done for the demographic element probability distribution representation, the system may receive, access or capture the user's keyboard dynamics (and/or X-Y device dynamics) and stores the timing and frequency of events. The results may be smoothed using a general kernel function to establish a kernel density estimator. The estimator calculates the likelihood that the typist belongs in the global set of users versus the demographic profile. As in Tables 1 and 2, similar tables are constructed for the global probability distribution representation as illustrated in Tables 3 and 4.

TABLE 3

Trigraph user timing events of keystroke collections for the global set of users.

| Right-handed Trigraph | Time (milliseconds) | | | | | | | |
|---|---|---|---|---|---|---|---|---|
| ABC | 0 | 100 | 101 | 102 | ... | 400 | ... | 5000 |
| frequency | 0 | 1000 | 1200 | 900 | ... | 15000 | ... | 10 |
| BCD | 0 | 100 | 101 | 102 | ... | 380 | ... | 5000 |
| frequency | 0 | 700 | 400 | 1300 | ... | 12000 | ... | 17 |

TABLE 4

Global probability distribution representation.

| Right-handed Trigraph | Time (milliseconds) | | | | | | | |
|---|---|---|---|---|---|---|---|---|
| ABC | 0 | 100 | 101 | 102 | ... | 400 | ... | 5000 |
| Likelihood | 0.00 | 0.05 | 0.06 | 0.05 | ... | 0.21 | ... | 0.00 |
| BCD | 0.00 | 100 | 101 | 102 | ... | 380 | | 5000 |
| Likelihood | 0.00 | 0.04 | 0.01 | 0.06 | ... | 0.18 | ... | 0.00 |

With both the demographic element probability distribution representation and the global or wide population probability distribution representation, the system may then apply rules or formulas such as Bayes Rule to determine a posterior probability for the observed demographic element is the actual demographic element under consideration. The posterior probability that the observed demographic element is the alleged demographic element, P(A/O), may then be given by P(A/O)=P(A)*L/((P(A)*L)+1−P(A)), where P(A) is the prior probability the demographic element is the alleged demographic element and L is the likelihood ratio. The likelihood ratio is given by P(O/A)/P(O/I), where P(O/A) is the probability the alleged demographic element produced the observations and P(O/I) is the probability a different demographic element produced the observations.

The present invention may also define a method and a system for establishing user identity and monitoring user identity in real time via the keyboard dynamics of the user. The system notifies the sentries of the identities when a discrepancy occurs between the active user and the purported user. The present invention records and analyzes the demographic profile of users to establish the demographic profile of a user, anonymously through keyboard dynamics.

Embodiments of this invention may provide a method to identify the demographic profile of a user who logs onto a device via keyboards. The behavior of the user keystrokes provides a likelihood that the user has certain demographic elements. This invention uses probability distribution representations to produce a faster more scalable implementation of determining the demographic profile. Embodiments of this invention may also provide a system to store the demographic profiles of the users entered in the system.

Aspects of the present invention may also define a method to acquire a demographic profile a user of a system with an X-Y device such as a mouse, by tracking the pattern of mouse dynamics for example made by the user with particular demographics or demographic group elements. The X-Y device dynamics such as computer mouse dynamic patterns may become an identifying signature for a particular demographic or demographic group. Embodiments of systems contemplated by this invention may define the means to record the mouse dynamics pattern and map the active user's data or characteristic data to a behavior, pattern or characteristic indicative of wide population data for a particular demographic or demographic group. Patterns from X-Y device dynamics such as computer mouse dynamics created by a user are unique to the user due to any one or more of a number of user factors such as the user's length of fingers, hand size, length of arm and position of the mouse. In some embodiments of this invention, the system or method provided may measure the dynamics or pattern by for instance recording the curser and mouse positions, the general resting positions of the cursor and the timing of the mouse movements and clicks. Some or most of these unique patterns of dynamics or behavior become identifiable or distinguishable signatures for the user.

Demographic probability distribution representations, probability tables or profiles may be established and monitored using mouse dynamics by mapping the demographic elements to n-gram measurements made on the mouse behavior and calculating the probability of the demographic element against the other possible demographic elements. To establish the probability distribution representations or profiles, n-gram measurements may be made based on the mouse dynamics. Table 5 is one example of an n-gram table of measurements for recording the x,y resting position of the mouse, where (0,0) is considered to be the upper left corner of the terminal screen for a left-handed person. The x,y values may among other things, represent the pixel value or any divided section of the terminal screen. Table 6 uses the measurement of speed along a chosen trajectory to record the unique mouse behaviormetrics of the user for the same handedness.

The global or wide population probability (which may also be referred to as Demographic B) may comprise the negative set of the demographic element. For instance, if handedness was under consideration, the left-handed probability distribution representation would yield the likelihood the user is left-handed and the impostor table is now the right-handed probability distribution representation, which will yield the likelihood that the user is right-handed. A perfectly ambidextrous person would be expected to yield a likelihood of approximately 0.50 in both probability distribution representations. Once the probability distribution representations are trained for a given desired demographic, or demographic cross-section, the system monitors the ongoing characteristics of the anonymous users and then associates a probability as to whether that user is within the given desired demographic. For the anonymous nature of websites on the Internet for example, embodiments of this invention allow for the collecting of data and data characteristics to ascertain the probability that the user is of a particular demographic, without intrusive questionnaires.

TABLE 5

Recording the resting positions and durations of the mouse for a left-handed person.

| Left-handed Resting position | | | | | | | |
|---|---|---|---|---|---|---|---|
| (0, 0) Time (seconds) | 0 | 10 | 11 | 12 | ... | 450 | ... | 3600 |

TABLE 5-continued

Recording the resting positions and durations of the mouse for a left-handed person.

| Left-handed Resting position | | | | | | | |
|---|---|---|---|---|---|---|---|
| Frequency | 0 | 100 | 140 | 120 | ... | 4 | ... | 6 |
| (200, 200) Time (seconds) | 0 | 10 | 101 | 102 | ... | 320 | ... | 3600 |
| Frequency | 0 | 200 | 250 | 180 | ... | 20 | ... | 2 |

TABLE 6

Recording the speed of mouse movement across trajectories.

| Left-handed Trajectory Vector | | | | | | | |
|---|---|---|---|---|---|---|---|
| (0, 1) Speed (pixels/second) | 0 | 200 | 300 | 400 | ... | 1000 | ... | 2000 |
| Frequency | 0 | 0 | 1 | 2 | | 47 | | 80 |
| (1, 1) Speed (pixels/second) | 0 | 200 | 300 | 400 | ... | 1000 | ... | 2000 |
| Frequency | 0 | 0 | 0 | 0 | | 36 | | 175 |

Once embodiments of this invention sufficiently capture the user profile, the system calculates the user probability distribution representation by applying a general kernel function, $K_h(x)$, which smoothes the measured data into a density estimator, given by:

$$K_h(x) = 1/h\, K(x/h)$$

where h=bandwidth and

K=Uniform, Triangle, Quartic, Gaussian, Cosinus, or etc. kernel function.

The parameter, h, determines the smoothness of the estimation. When h approaches zero ($h \to 0$), the kernel estimation is less smooth, and when h approaches infinity ($h \to \infty$), the kernel estimation is very smooth. Once trained for a user, the system may return a likelihood value for that user. Table 7 illustrates the calculation of the likelihood for each mouse resting position event for a left-handed person.

TABLE 7

Left-handed probability distribution representation.

| Left-handed Resting position | | | | | | | |
|---|---|---|---|---|---|---|---|
| (0, 0) Time (seconds) | 0 | 10 | 11 | 12 | ... | 450 | ... | 3600 |
| Likelihood | 0 | 0.10 | 0.11 | 0.09 | ... | 0.01 | ... | 0.01 |
| (200, 200) Time (seconds) | 0 | 10 | 101 | 102 | ... | 320 | ... | 3600 |
| Likelihood | 0 | 0.20 | 0.22 | 0.19 | ... | 0.01 | ... | 0.0 |

To make the probability distribution representation more adaptive, more parameters and training can be tied to the probability distribution representation, such as time of day or type of application. The size of the user probability needs only to be as large as the X-Y device such as a mouse, and the action space for the user. In the case of continuous authentication of the user, then the user probability distribution representation should preferably contain the entire set of possible n-gram measurements.

To establish the probability profile for other possible demographic elements, the system establishes a global probability distribution representation which stores the probability profile of the other possibilities to determine the probability that the user belongs to a different demographic group. As done for the user probability distribution representation, the system may capture the user's mouse dynamics and then store the timing and frequency of events. The results may then be smoothed using a general kernel function to establish a kernel density estimator. The estimator calculates the likelihood that the typist belongs in the global or wide population grouping or set of users, versus the user demographic profile. As in Tables 5, 6 and 7, similar tables are constructed for the global probability distribution representation as illustrated in Tables 8 and 9.

TABLE 8

Global record of resting positions and times of mouse.

Right-handed Resting position

| | | | | | | | |
|---|---|---|---|---|---|---|---|
| (0, 0) Time (seconds) | 0 | 10 | 11 | 12 | ... | 450 | ... 3600 |
| frequency | 0 | 100 | 140 | 120 | ... | 4 | ... 6 |
| (200, 200) Time (seconds) | 0 | 10 | 101 | 102 | ... | 320 | ... 3600 |
| frequency | 0 | 200 | 250 | 180 | ... | 20 | ... 2 |

TABLE 9

Global probability distribution representation for the resting positions and times of mouse.

Right-handed Resting position

| | | | | | | | |
|---|---|---|---|---|---|---|---|
| (0, 0) Time (seconds) | 0 | 10 | 11 | 12 | ... | 450 | ... 3600 |
| frequency | 0 | 0.06 | 0.09 | 0.09 | ... | 0.15 | ... 0.01 |
| (200, 200) Time (seconds) | 0 | 10 | 101 | 102 | ... | 320 | ... 3600 |
| frequency | 0 | 0.10 | 0.08 | 0.07 | ... | 0.18 | ... 0.0 |

With both the user probability distribution representation and the global probability distribution representation, embodiments of systems provided by this invention may apply a conditional probability calculator such as Bayes Rule to determine a posterior probability that the observed user belongs to a specified demographic group. The posterior probability that the observed demographic is the alleged demographic, P(A/O), is given by P(A/O)=P(A)*L/((P(A)*L)+1−P(A)), where P(A) is the prior probability the demographic element is the alleged demographic and L is the likelihood ratio. The likelihood ratio is given by P(O/A)/P(O/I, where P(O/A) is the probability the alleged demographic element produced the observations and P(O/I is the probability a different demographic element produced the observations.

This invention provides a method to identify the demographic profile of a user who logs onto a device via for instance the mouse dynamics of the user. The behavior of the user mouse dynamics provides a likelihood that the user has certain demographic elements. This invention uses probability distribution representations to produce a faster, more scalable implementation of determining the demographic profile. This invention also provides a system to store the demographic profiles of the users entered in the system.

FIG. 1 is a perspective view of a user keying on a traditional keyboard, showing user hands 102, keyboard 100, keys 101, and cord 103 which may attach the keyboard to a data processing apparatus, or in the alternative, the keyboard may be wireless and communicate in a wireless manner with a data processing apparatus (not shown in FIG. 1).

Some aspects of this invention may capture or access the timing of certain keystrokes as one exemplary data element, or as a characteristic. Examples given below would be for a sequence of typing the keys such as ABC, and another example referencing the typing of keys BCD. However, it will be appreciated that the typing of any key sequence may be utilized depending upon the data, and the comparisons where authentication may be sought. It will also be appreciated by those of ordinary skill in the art that any one of a different number of keys may be included within the sequence to arrive at data to be utilized in aspects of this invention. For example, in the illustration shown in FIG. 1, a key stroke sequence may be established for keys 104, 105, 106, 107, 108 and 109, which may represent a common sequence or word commonly typed or keyed by users being authenticated. Any sub-combination, reverse combination or shorter or longer combinations may also be utilized.

It will also be appreciated by those of ordinary skill in the art that because embodiments of this invention have so many different applications, the term data as used herein may constitute a multitude of different measurements, characteristics, timings, any other element that can be measured or used to distinguish different individual users, different users within identified demographics and different demographic groups, to name a few.

Figure 2:
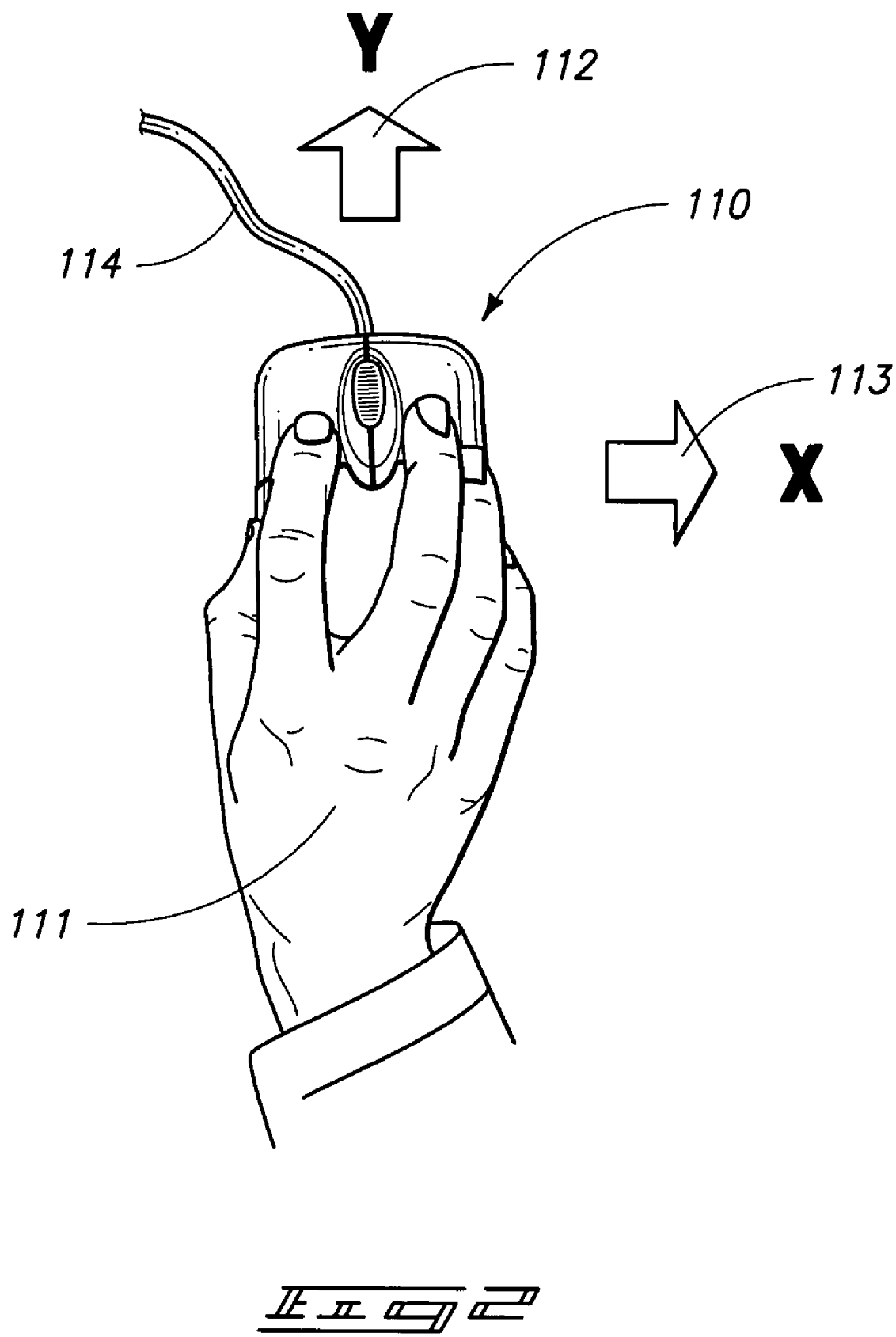
FIG. 2 is a top view of a user handling and moving an X-Y device, which in this example is a traditional computer mouse.

FIG. 2 is a top view of a user handling and moving an X-Y device, namely in this example a traditional computer mouse 110 providing the X-Y device dynamics, with connection cord 114, user hand 111, X direction movement indicated by arrow 113 and Y direction movement indicated by arrow 112.

Figure 3:
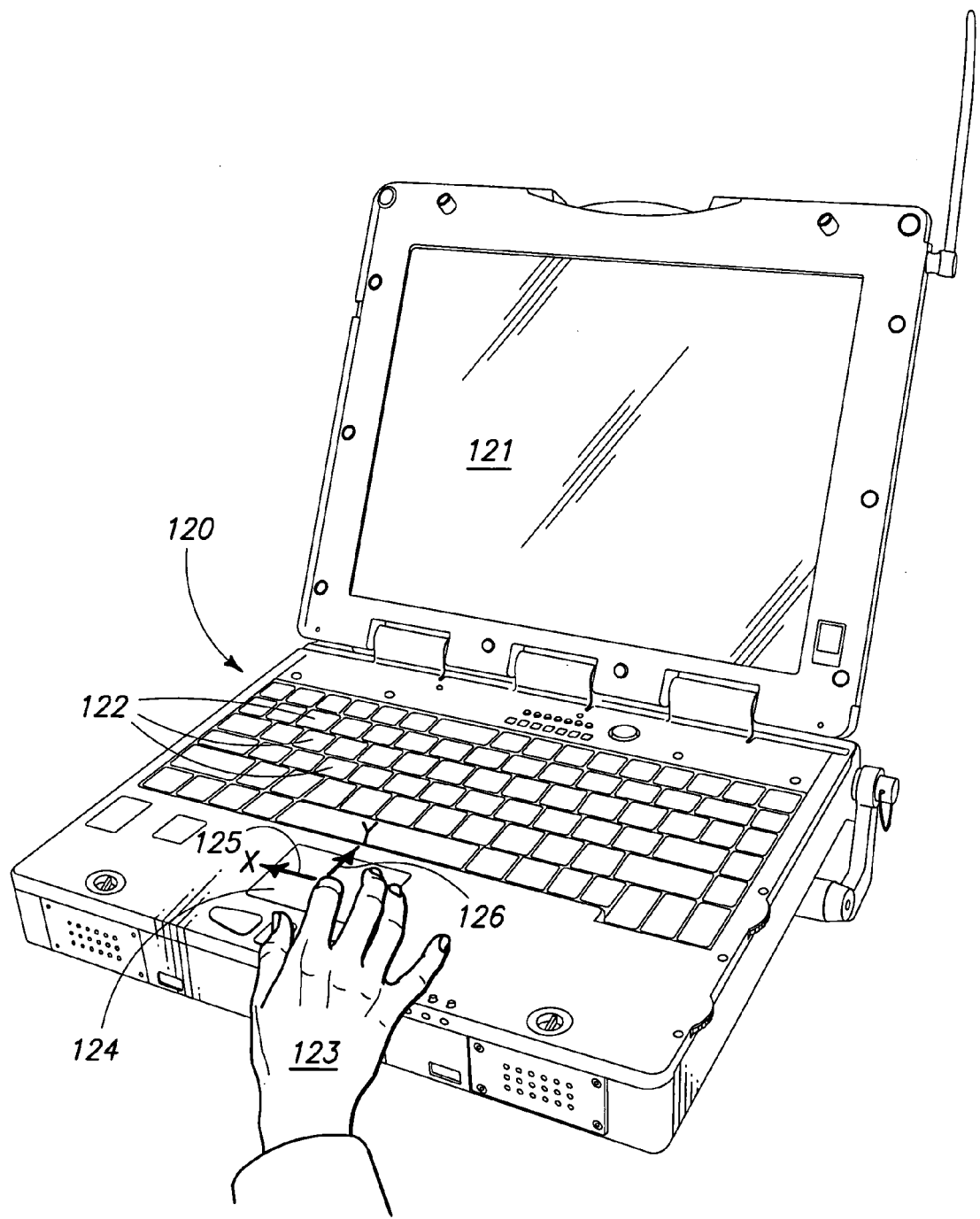
FIG. 3 is a perspective view of a user using a touch pad on a traditional laptop computer which also includes a keyboard, the touch pad being an X-Y device which may also measure pressure applied thereto.

FIG. 3 is a perspective view of a user's hand 123 using a touch pad 124 on a traditional laptop computer 120 which also includes a keyboard, the touch pad being an X-Y device which may or may not also measure pressure applied thereto. FIG. 3 illustrates computer screen or monitor 121, X-direction 125 and Y-direction 126 movement, and computer keys 122. It will be appreciated by those of ordinary skill in the art that the touch pad 124 is an X-Y device, with X-Y device dynamics, but that it may also sense and provide data on pressure applied to the touch pad 124. The embodiments which may utilize pressure data may provide a substantial additional amount of measurable data from which distinctions can be made of users.

FIG. 4 is a block diagram of an exemplary data processing apparatus 140. FIG. 4 illustrates that communications interface 141 is arranged to implement communications of computing device 140 with respect to external devices not shown. For example, communications interface 141 may be arranged to communicate information bi-directionally with respect to computing device 140. Communications interface 141 may be implemented as a network interface card (NIC), serial or parallel connection, USB port, FireWire interface, flash memory interface, floppy disc drive, or any other suitable arrangement for communicating with respect to computing device 140.

In one embodiment, processing circuitry is arranged to process data, control data access and storage, issue commands, and control other desired operations. Processing circuitry 142 may comprise circuitry configured to implement desired programming provided by appropriate media in at least one embodiment. For example, the processing circuitry 142 may be implemented as one or more of a processor and/or other structure configured to execute executable instructions including, for example, software and/or firmware instructions, and/or hardware circuitry. Exemplary embodiments of processing circuitry include gloom hardware logic, PGA, FPGA, ASIC, state machines, and/or other structures alone or in combination with a processor. The storage circuitry 143 is configured to store programming such as executable code or instructions (e.g., software and/or firmware), electronic data, databases, or other digital information and may include processor-usable media. Processor-usable media may be embodied in any computer program, product(s), or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semi conductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 143 described above and/or communicated via a network or other transmission media and configured to control appropriate processing circuitry 142. For example, programming may be provided via appropriate media including, for example, embodied within articles of manufacture, embodied within a data signal (e.g. modulated carrier wave, data packets, digital representations, etc.) communicated via an appropriate transmission medium, such as a communication network (e.g. the Internet and/or a private network), a wired in electrical connection, optical connection and/or electromagnetic energy, for example, via a communications interface 141, or provided using other appropriate communication structure or medium. Exemplary programming including processor-usable code may be communicated as a data signal embodied in a carrier wave in but one example.

User interface 144 is configured to interact with a user including conveying data to a user (e.g., displaying data for observation by the user, audibly communicating data to a user, etc.) as well as receiving input from the user (e.g., tactile input, voice instruction, etc.). Accordingly, in one exemplary embodiment, the user interface may include a display 145 (e.g., cathode ray tube, LCD, etc.) configured to detect visual information as well as a keyboard, mouse, touch pad, and/or other input device 146. Any other suitable apparatus for interacting with a user may also be utilized, including three-dimensional interfaces which instead of merely being on an X-Y plane may include three dimensions, namely X, Y and Z.

In some embodiments of this invention for example, the data processing system illustrated in FIG. 4 may be such a data processing apparatus to associate a user of an electronic system with a demographic, and which may include a communication interface; storage circuitry including at least one wide population probability distribution reference indicative of a demographic associated with a first data characteristic; and processing circuitry configured to access user data which includes the first data characteristic, and further configured to compare the user data to the at lease one wide population probability distribution reference, and determining a probability that the user is of the demographic based on the comparing. It will be appreciated by those of skill in the art that a data processing apparatus that they may be configured in different ways to include embodiments of the invention disclosed herein, with no one particular configuration being required to practice the invention.

It will be understood that when components, apparatus, appliance, functions, steps or elements of this invention need to be or may be implemented on a data processing apparatus as a whole, or any individual component thereof described herein, that the apparatus or any individual component as described herein may be utilized within the contemplation of this invention. For instance, if a flowchart as described below expressly or implicitly requires for example that a processor or storage be utilized, the applicable components described herein with respect to FIG. 4 may be so utilized even if not specifically recited for that step.

Figure 5:
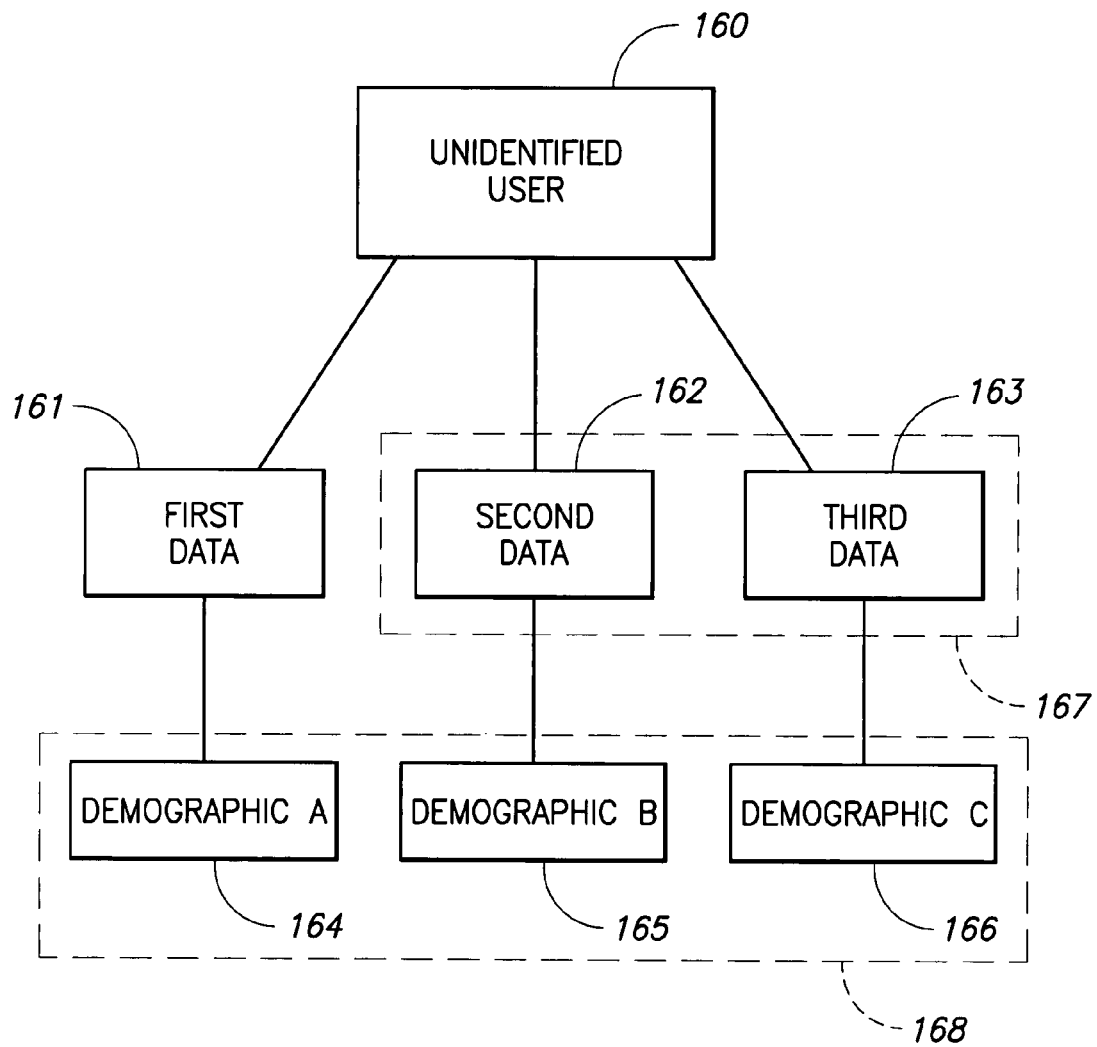
FIG. 5 is a block diagram of one embodiment of this invention as it may be utilized to demographically or individually identify an otherwise unidentified user.

FIG. 5 is a block diagram of one embodiment of this invention as it may be utilized to demographically or individually identify an otherwise unidentified user, illustrating an unidentified user 160, first data characteristic 161 of demographic A 164, second data characteristic 162 indicative of demographic B 165, and third data characteristic 163, indicative of demographic or demographic group C 166. Grouping 167 illustrates that one or more data characteristics may be combined in associating a probability of a user being in a particular demographic or demographic group. Box 168 illustrates that a data processing apparatus may be provided which includes at least one probability distribution reference, and the data processing apparatus may be provided to access or receive data to then associate a probability as to whether a user is of one or more demographics or demographic groups.

This invention contemplates that data processing apparatuses may be operatively connected to electronic systems to receive at least one data characteristic from the system to associate users of the system with predetermined demographics or demographic groups.

FIG. 5 illustrates how embodiments of this invention may provide a data processing apparatus which may be represented by box 168, which may be configured with one or more components set forth and described with respect to FIG. 4, to provide associations of a user of an electronic system to at least one demographic, comprising: a data processor (as may be described relative to FIG. 4) configured to receive a data characteristic such as third data characteristic 163, which includes one or more data characteristics of a unidentified user or a user whose demographic has not yet been identified; storage circuitry (as may be illustrated and described relative to FIG. 4) including at least one wide population probability distribution reference indicative of the demographic associated with the data characteristic would be included in data; and processing circuitry configured to access the data characteristic, and further configured for comparing the data characteristic to the at lease one wide population probability distribution reference; and the processing circuitry may then determine a probability that the data characteristic is indicative of the demographic based on the comparing.

Figure 6:
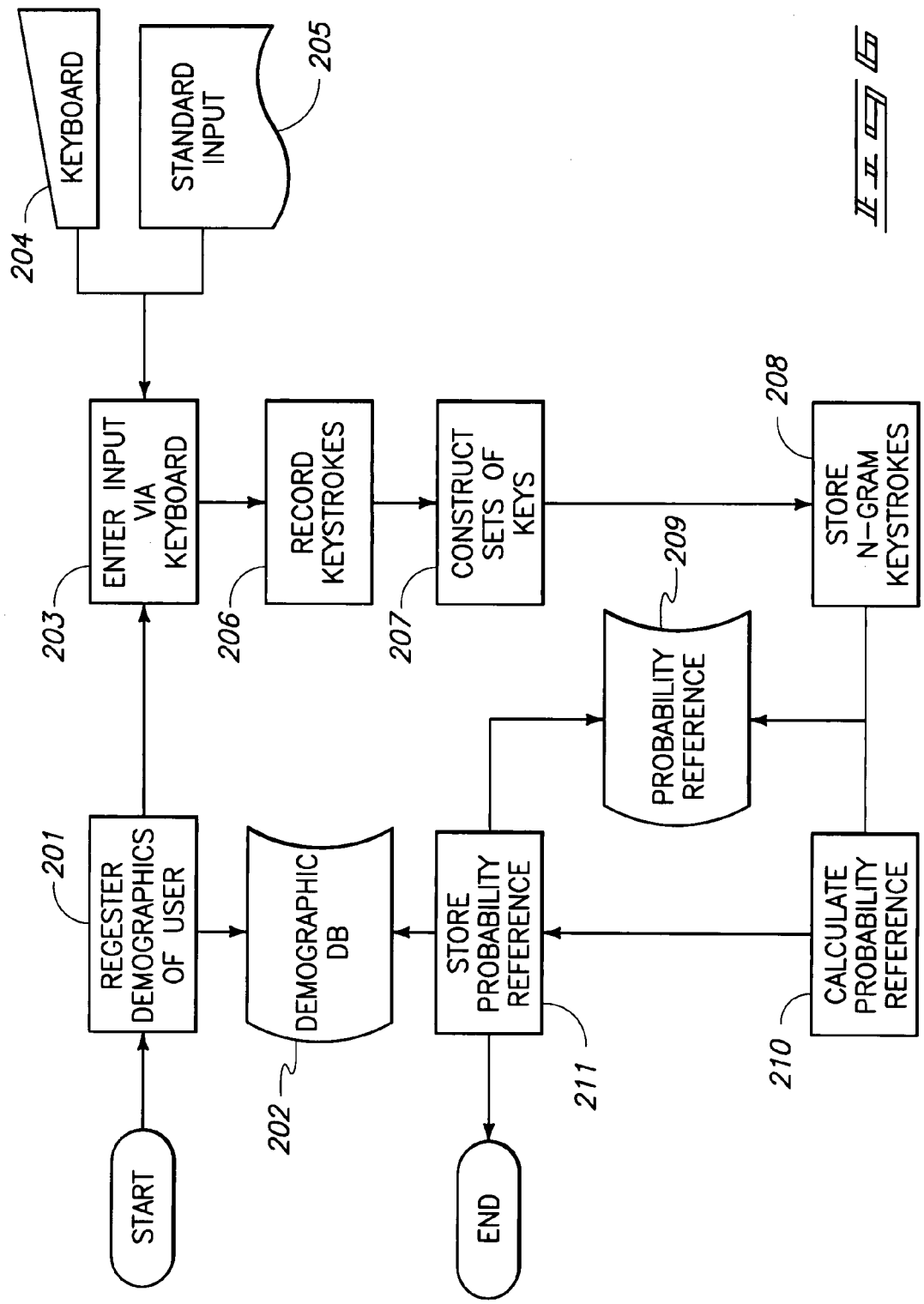
FIG. 6 is a flowchart illustrating one embodiment of the invention wherein collection and storing of keyboard dynamics for demographic are utilized to determine the demographic element of an anonymous or unidentified user.

FIG. 6 is a flowchart illustrating one embodiment of the invention wherein collection and storing of keyboard dynamics for demographic element are utilized to determine the demographic element of an anonymous or unidentified user. FIG. 6 illustrates the process flow for capturing the keyboard dynamic profiles for demographic elements. In a controlled environment, the known demographics of a user are registered 201 into the demographic database 202. Through the keyboard, the user enters 203 standard input 205 to begin the training through the keyboard 204. The system records the keystrokes 206, and then constructs the keystrokes into n-gram sets 207. The n-gram keystrokes are stored 208 into the probability distribution representation database 209. The keystroke events are constructed into probability distribution representations 210, and the n-gram keystrokes with the probability distribution representations are stored into the probability distribution representation database 211. The keyboard dynamics are recorded and probability distribution representations are generated for the demographic elements.

It will be noted that while a preferred way of constructing probability distribution references, embodiments of this invention are not limited to any single method or system, but instead multiple other methods or systems may also be implemented in practicing some aspects of this invention.

Figure 7:
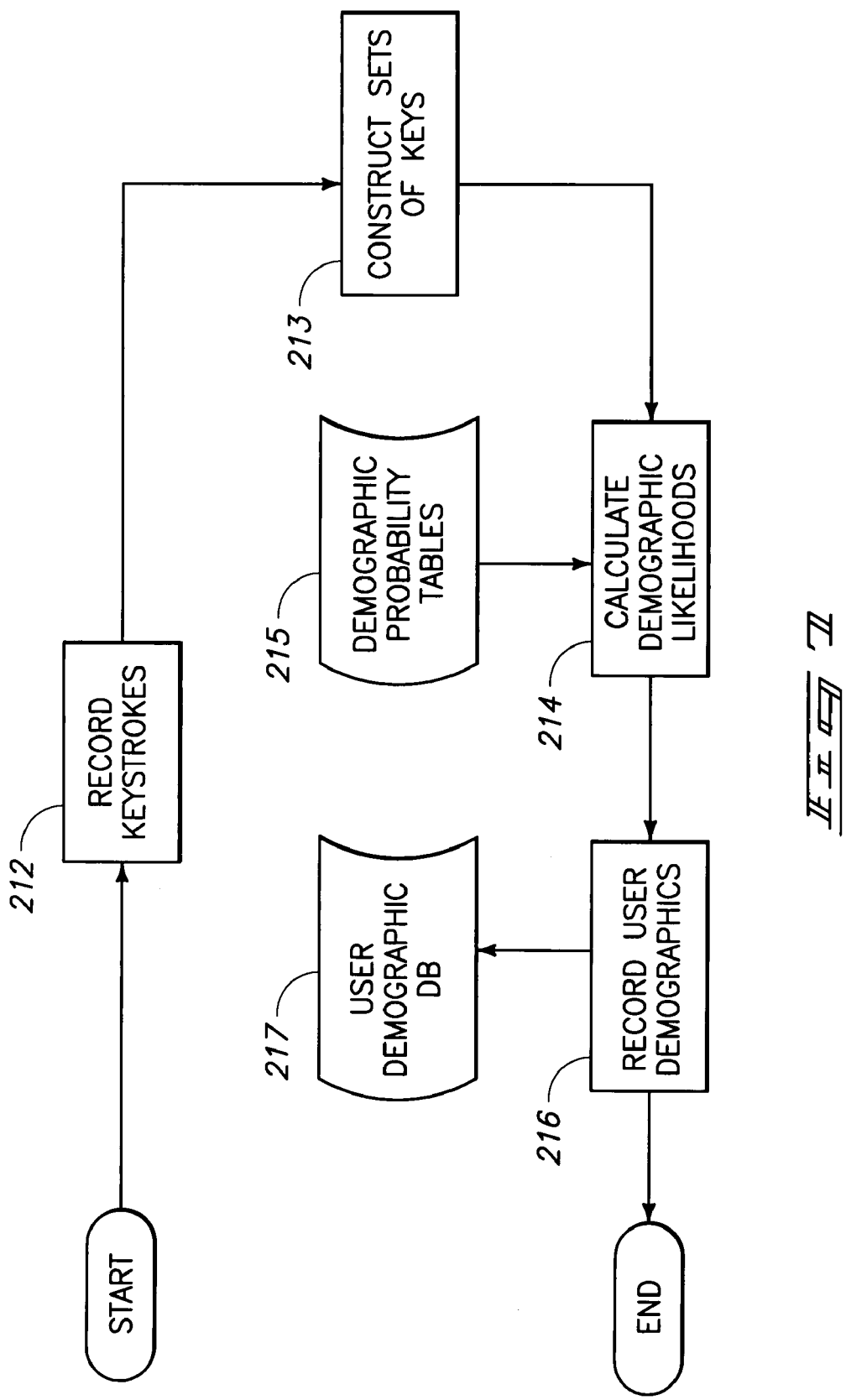
FIG. 7 is a flowchart illustrating one embodiment of the invention wherein collection and storing of keyboard dynamics for demographic are utilized to determine the demographic of an anonymous or unidentified user.

FIG. 7 is a flowchart illustrating one embodiment of the invention wherein collection and storing of keyboard dynamics for demographic element are utilized to determine the demographic element of an anonymous or unidentified user. FIG. 7 illustrates the process flow for capturing the demographic profile of an anonymous user. The system records the keystrokes of the user 212 and constructs the n-gram set of keys 213. Using the demographic probability distribution representations 215 produced in FIG. 7, the system calculates the likelihood of specific demographic elements for a user 214. The calculated demographic likelihood events are stored 216 in the user demographic database 217, where they can be collated and analyzed.

FIG. 8 is a graphic representation of one embodiment of a probability distribution representation 400 for keystroke timings or dynamics of persons of a demographic, namely Demographic A, typing keystrokes ABC, sometimes referred to as a trigram since three keys are included. Even though there are three keys being identified as data or a characteristic for a given application, any other type of measurement or type of or combination of measurements may be taken to quantify that characteristic, and then utilized to distinguish persons of Demographic A from persons of another demographic such as Demographic B, or from the wide population or global population from which it is desired to distinguish the authorized user. Determining whether new use data such as data 411 or data 415 are indicative of use by one possessing demographic A may be accomplished by comparing the new data points to the probability distribution reference as shown in FIG. 8, or by comparing the new data points to a second demographic such as demographic B, which may represent the inverse of demographic A (for example if demographic A is all left-handed people, then demographic B may be representative of all right-handed people, for distinction); or demographic B may represent the general wide population with no particular demographic characteristic involved so that the data point is processed through a comparison to the probability distribution reference for demographic A versus the general wide population demographic probability distribution reference.

Item 401 is the numeral one and indicates that the probability goes from zero represented by item 406, to the number one represented by item 401, as will be appreciated by those of ordinary skill in the art, on a statistical modeling basis. The probability 403 is graphed in the Y direction and the time 404 in this aspect or embodiment of the invention is measured in milliseconds. The graphic representation shows the time 404 going from zero, which is represented by item 406, to 5000 milliseconds represented by item 407.

FIG. 8 also illustrates how a couple of new data points or items may be compared against the probability distribution representation for demographic A 400. For instance, if data 411 is obtained at the millisecond level represented by 414, it may be expected that a user who is within Demographic A would show a value at the intersection represented by 409. However, the data 411 is located some distance below intersection 409. The distance from data 411 to intersection 409 is represented by bracket 412 and the distance 413 between data 411 and intersection 414 is represented by bracket 413. In this example a visual check on the location of data 411 at the milliseconds represented by intersection 414, would indicate it is more probable than not that the data point represents a user who is within Demographic A. It will be appreciated by those of ordinary skill in the art that depending upon the probabilities and the sensitivity and scaling of the probability distribution representation, a greater or lesser distance may or may not be indicative that it is more probable that the new data from the users whose demographics are not known is a user who is within Demographic A.

It will be appreciated by those of ordinary skill in the art that for illustrative purposes, graphical representations of the probability distribution representations are shown in the figures; however any type of representation thereof may be utilized within the contemplation of this invention, such as graphical representations, database or other data structure representations, or any nongraphical representations of the probability distribution, with no one in particular being required to practice this invention.

In a second example in FIG. 8, new data 415 is shown with intersection 416 indicating the number of milliseconds, and intersection 417 indicating the intersection with the graphic profile or trigram for users within Demographic A. Distance 418 from intersection 417 and distance 419 from intersection 416 would be utilized in any one of a number of different ways to calculate a probability that new data 415 is indicative of use by a user within Demographic A.

It will also be appreciated by those of ordinary skill in the art that the representation shown in FIG. 8 need not be limited to keyboard dynamics, but may also include an X-Y dynamic related to the speed at which a user moves the X-Y device, such as mouse speed from point A to point B.

FIG. 8 represents one aspect of an embodiment of this invention wherein a trigram or three key keystroke is utilized to pattern or fingerprint users who may fall into Demographic A, which can be one measurement taken of users within Demographic A, or it could be an averaging or other statistical representation of two or more measurements blended together to arrive at curve 405 in FIG. 8, up to some very high number of measurements scaled to present one probability distribution representation. FIG. 8 shows a narrow band of occurrences in milliseconds relative to probability, which as will be described relative to later figures, makes users within Demographic A relatively distinctive from users within Demographic B, which may be a particular demographic, an inverse demographic to Demographic A, or a general wide population probability distribution representation.

In embodiments of this invention, the area 409 under curve 405 should also be one based upon probability distribution representation analysis. The curve 405 is a first constant that gives a continuous basis upon which to compare new data or data on curve 405, to a trigram for Demographic B, such as the Demographic B trigram set forth in FIG. 10 for the ABC keystroke combination. Demographic B trigram may be of a particular demographic wide population group, or of a general wide population group with no particular demographics assigned, i.e. the general population.

Since many features are recorded for keystroke dynamics, the probability distribution representations can be used to determine more distinguishing features of a demographic group, or even of new data relative to a plurality of demographic groups. Those of ordinary skill in the art will appreciate that the same or similar features may be recorded for X-Y device dynamics. In turn, the distinguishing features can be used to construct a biased scoring system to associate new data from a user whose desired demographics are not known, to one or more demographics. FIGS. 8-11 illustrate the graphs of the probability distribution representations constructed from the data in Tables 2 and 4.

Overlaying the probability distribution references, shown in graphical format in FIGS. 8-11, between Demographic A and Demographic B for each trigram is graphically illustrated in FIGS. 12 and 13. If a calculation of the difference in area 470 and 471 respectively, between the curves, which is the hashed area between the graphs is made, the ABC trigram demographic probability distribution representations show a larger deviation from the global or wide population probability distribution representation than that for the BCD trigram probability distribution representation. Therefore, the ABC trigram is likely a more distinguishing feature for users falling within Demographic A. The total difference in area under the Demographic A and Demographic B, as shown graphically for the ABC trigram, is 1.1, while the total difference in area graphically illustrated in the figures for the BCD trigram, is 0.20. Normalizing these values produces a weighting vector for calculating the final posterior probability. The weighting vector is 0.85 and 0.15 for the ABC and BCD trigrams respectively, yielding a final posterior probability given by the following equation:

$$\text{Posterior}_{final} = (0.85 * \text{Posterior}_{ABC}) + (0.15 * \text{Posterior}_{BCD})$$

The total posterior calculated for determining the likelihood that a user is within Demographic A is now biased towards the posterior probability returned from the ABC trigram measurement. A user will more likely fall in Demographic B, which may be the general wide population and the calculated total posterior will reflect a strengthened likelihood that the new user will be identified with Demographic B. The weights attributed to the features of the trigram measurements can also be used in constructions of neural networks, support vector machines and boosting algorithms to further strengthen the bias of the more distinguishable features of an individual.

FIG. 9 is a graphic representation of one embodiment of a probability distribution representation for keystroke timings of a user falling within Demographic A typing keystrokes BCD. The graphical item numbers, item descriptions and the descriptions of the graph format, the X and Y parameters and measurements, is recited above with respect to FIG. 8, and all like items are numbered accordingly and a description thereof will not be repeated here to avoid repetition. FIG. 9 is a graphic representation of users within Demographic A typing a keystroke combination of BCD, a trigram, which provides a table of a similar graphic representation, but a very different curve than that shown for users within Demographic A for the ABC trigram in FIG. 8. The curve illustrated in FIG. 9 is very different than the curve illustrated in FIG. 8 for users within the same demographic, namely Demographic A. The area 423 under curve 421 in probability distribution representation 420 should be one. Curve 421 is shown peaking at 421a.

Figure 10:
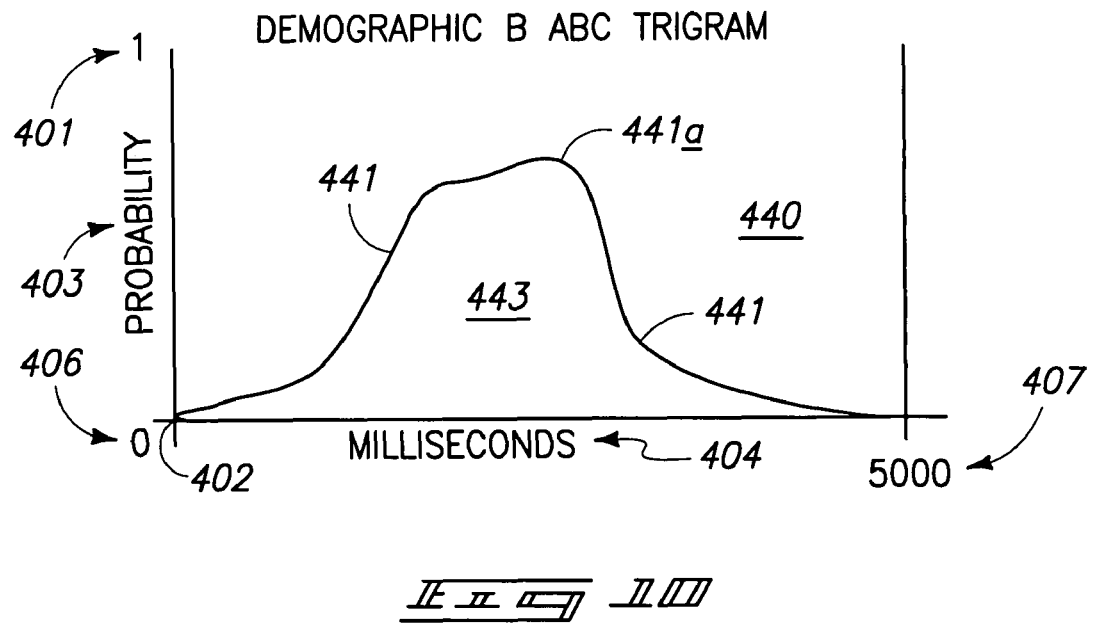
FIG. 10 is a graphic representation of one embodiment of a probability distribution representation for keystroke timings of users within demographic B typing the keystroke combination of ABC.

FIG. 10 is a graphic representation of one embodiment of a probability distribution representation for keystroke timings of inusers or persons falling within demographic B typing keystrokes ABC. Demographic B may represent the general wide population, a demographic inverse to Demographic A, or in other particular desired demographic, depending upon the application, all in the contemplation of this invention. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 10 illustrates what may be referred to as a first characteristic probability distribution representation, in this example, of users within demographic B inputting the ABC trigram. Again, the probability distribution representation in FIG. 10 is shown in graphical format, but it may also be shown or utilized in other formats, such as tabular, histogram common data tables and others, all the contemplation of this invention. FIG. 10 shows curve 441 with curve peak 441a, area 443 under curve 441 on probability distribution representation 440 illustrates the probabilities of timing of keystrokes from a user within Demographic B.

It will be appreciated by those of ordinary skill in the art that the selection of the first characteristic upon which to take data for, or the second third or later characteristics, will be something that greatly depends upon the facts and circumstances of the application, readily available data, readily available measurements and numerous other factors, all within the contemplation of this invention. Utilizing one or more probability distribution representations of data or characteristics, provides a very scalable method of taking data in large quantities, that can be pre-determined on a case-by-case basis depending upon the facts and circumstances. It will be noted that very large numbers of data points can be used to construct a probability distribution representation or histogram against which to compare characteristics or data of new data individuals. This invention therefore may provide a way to associate users with demographics on very large electronic systems such as the World Wide Web or Internet since the data count, whether one thousand in number or whether two billion in number, can be placed into one probability distribution representation, which means that new data points accessed for association with demographic, may only need to be compared against one probability distribution representation (it may be compared against more than one depending on the application, but much fewer than otherwise required if a neural net is used and the number of comparisons required for associating within demographic may be quite large). In some applications the wide population data or characteristic can comprise the probability distribution representation profile table or graph, and in others it may represent data from multiple, numerous or a multitude of persons (such as within a demographic or within a broader universe). The benefits of scalability that embodiments of this invention provide may be achieved in any one of a number of different applications, and may be especially beneficial in applications where there are large numbers of data points and massive information, in such applications as homeland security, internet monitoring, dealing with large online enterprise information, and others.

Figure 11:
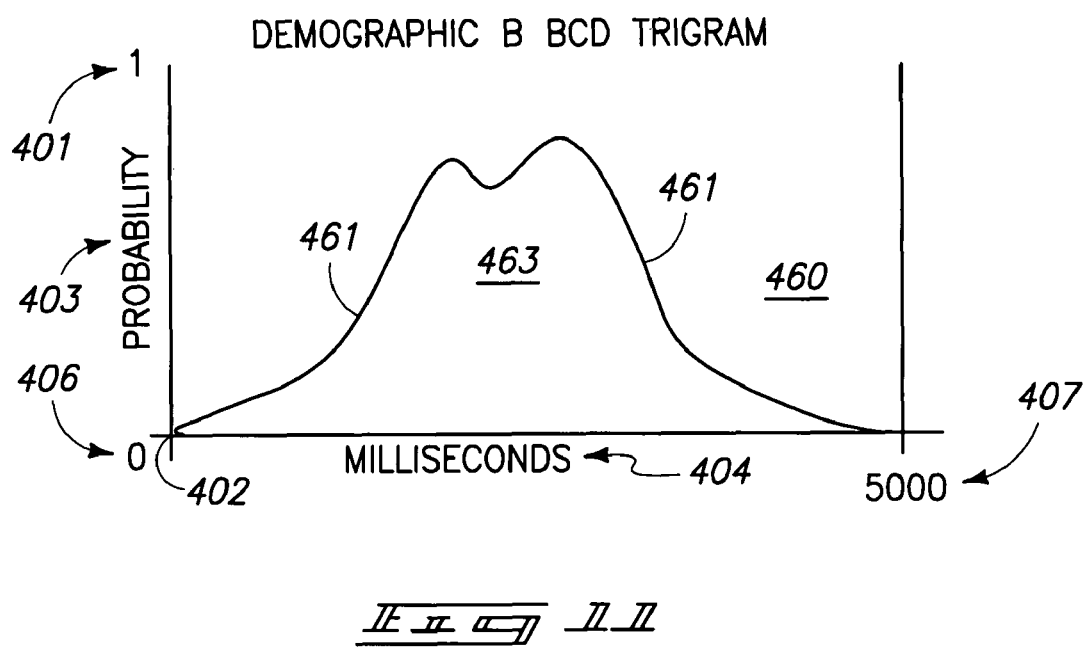
FIG. 11 is a graphic representation of one embodiment of a probability distribution representation for keystroke timings of users within demographic B typing the keystroke combination of BCD.

FIG. 11 is a graphic representation of one embodiment of, a probability distribution representation for keystroke timings of users falling within Demographic B and typing the keystrokes BCD. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 11 represents a probability distribution representation 460 for users within Demographic B typing the keystroke combination or trigram BCD, with area 463 under curve 461. Similar to the probability distribution representation in FIG. 10, the probability distribution representation 460 in FIG. 11 may be that of numerous data points from a smaller population or from a very wide population, depending upon the application, the available data and the distinctions between demographics which may be desired.

FIG. 12 is a graphic representation of a probability distribution representation for Demographic A, and for Demographic B, typing the keystrokes ABC, each as previously illustrated in FIGS. 8 & 10. The graphical item numbers, item descriptions and the descriptions of the graph format, the X and Y parameters and measurements, is recited above with respect to FIG. 8, and all like items are numbered accordingly and a description thereof will not be repeated here to avoid repetition. Again, neither a graphical representation nor an overlay is required to practice this invention, but is shown in FIGS. 12 and 13 for illustrative purposes.

FIG. 12 illustrates some of the numerous possibilities for use of the probability distribution representations as may be utilized by embodiments of this invention. The probability distribution representation illustrated in FIG. 12 is an overlay of the probability distribution representation in FIG. 8 over the probability distribution representation illustrated in FIG. 10, which are both showing users of demographic groups typing the keystrokes ABC. The graphical representation in FIG. 12 shows substantial distinctions or uniqueness between users within Demographic A from users within Demographic B as they each type the keystrokes ABC. Curve 405 is the Demographic A curve profile on the probability distribution representation, and curve 441 is the Demographic B curve profile on the probability distribution representation for users within Demographic B typing the keystrokes ABC. The area 470 between curve 405 and curve 441 provides a larger area upon which to distinguish or compare a given data point placed therein to users within Demographic A curve 405 versus the Demographic B curve 441.

FIG. 13 is a graphic representation of one embodiment of a probability distribution representation for users falling within Demographic A and Demographic B respectively, typing the keystrokes BCD, as also illustrated in FIGS. 9 and 11. The graphical item numbers, item descriptions and the descriptions of the graph format, the X and Y parameters and measurements, is recited above with respect to FIG. 8, and all like items are numbered accordingly and a description thereof will not be repeated here to avoid repetition.

In a similar manner to FIG. 12, FIG. 13 is an overlay of the users falling within Demographic A typing in the keystrokes BCD, which may also be referred to as a BCD trigram, as graphically represented by curve 421. Curve 461 is the same as the curve illustrated in FIG. 11. From comparing curve 421 to curve 461 in FIG. 13, it is apparent that users within Demographic A are relatively similar to users falling within Demographic B, as graphically represented by the respective curves 421 and 461. In comparing and contrasting the respective probability distribution references shown in FIG. 13 to that in FIG. 12, it becomes apparent that in choosing the best characteristic of this set to use to associate with new data or users whose desired demographic is unknown, to either Demographic A or to Demographic B, using the keystroke combination ABC would be a better way to associate the new data or user with either Demographic A or Demographic B (as compared to the keystroke combination BCD).

FIG. 14 is an example of a flowchart of an embodiment of this invention illustrating one possible sequence for constructing a biased scoring system using a characteristic data for users falling within Demographic A or Demographic B. FIG. 14 illustrates the process flow to construct weights for the features captured by keystroke dynamics, but could also be applied to X-Y device dynamics, such as a computer mouse or touch pad. The system includes start 500, a retrieval of user probability distribution representation 501 from the probability distribution representations 502 for data, characteristics or identifying features for users falling within Demographic A, or Demographic B. The system retrieves the 503 probability distribution representations 502 for Demographic B for each feature recorded for the Demographic B base. Again, it should be noted that the Demographic B may be a global or general wide population data set and need not be that of a particular other demographic. The probability curve of users falling within Demographic A may then be compared to the Demographic B probability curve or probability distribution representation, with a value then being calculated 504 for each feature based on the difference the Demographic A probability curve (or probability distribution reference) deviates from the Demographic B global probability curve (or probability distribution reference). The values may be normalized 505 to construct a weighting vector for the set of features recorded for keystroke dynamics. The values from the normalization are stored 506 with the probability distribution representations for each feature recorded for Demographic A.

Figure 15:
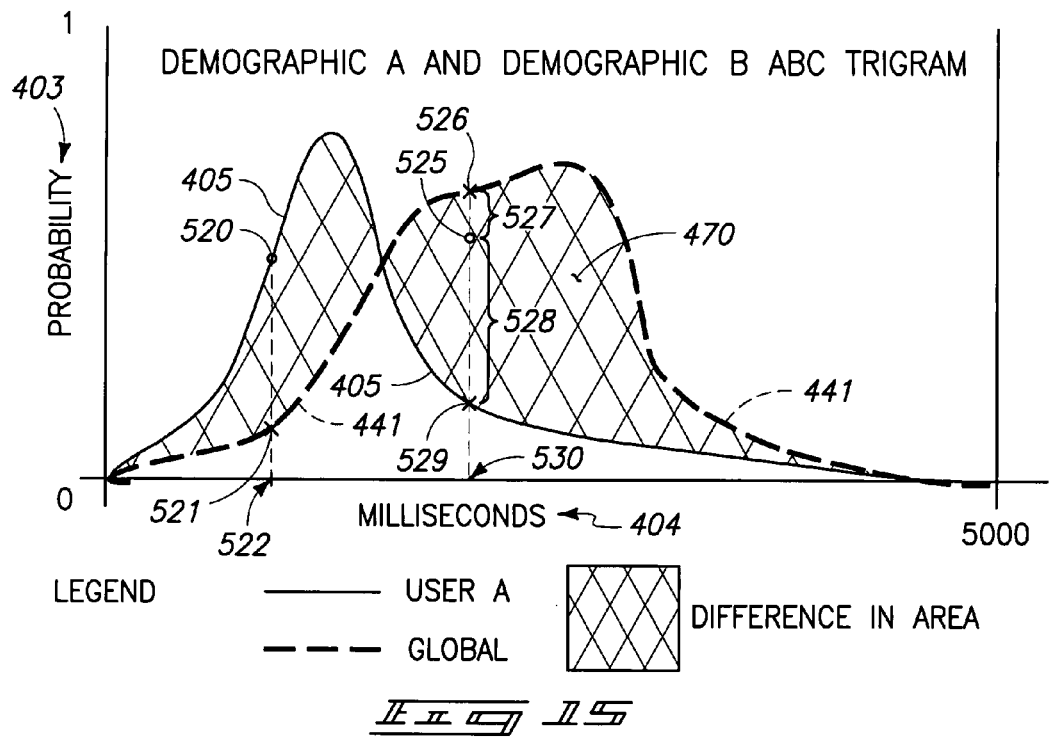
FIG. 15 is a graphic representation of the probability distribution representations illustrated in FIGS. 8 and 10 combined, with exemplary new data from a user of unknown demographics typing the keystrokes ABC.

FIG. 15 is the graphic representation of one embodiment of a probability distribution representation as illustrated in FIG. 12, and further wherein a couple of exemplary new data points or characteristics for users whose desired demographic are not yet known, are applied into the table to determine a probability as to whether the user belongs to a particular demographic group based on the data of typing the keystrokes ABC. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 15 also illustrates how data may be applied to one probability distribution representation such as curve 405, or to a second probability distribution representation represented by curve 441, separately or in combination. If separately applied, it would be similar to the application referred to above in FIG. 8 relative to data 411 or data 415, but if applied to the combination of the two probability distribution representations, a graphical overlay, it could be to determine whether it was more likely new data is from a first demographic such as Demographic A, or a second demographic such as Demographic B. For instance curve 405 may represent a characteristic or attribute of users falling within Demographic A, and curve 441 may represent a characteristic or attribute of users falling within Demographic B. Such a comparison may be utilized to determine if a new data point is indicative that the user is within Demographic A, and the probability distribution reference for Demographic B is primarily for distinction purposes in determining whether the new data is indicative that the user is within Demographic A. The Demographic B users may be inverse or opposite to those falling within Demographic A common such as men versus women or left-handed people versus right-handed people. It will be appreciated by those of ordinary skill in the art that the application methodology explained here and will work to distinguish between demographics or demographic groups, individuals or between data types are characteristics that best distinguish an individual from a group or a group from another group, all within the contemplation of this invention.

FIG. 15 illustrates data 520 falling on curve 405 at millisecond 522, intersecting curve 441 at 521. This would tend to indicate that data 520 is data representing users within Demographic A more probably than it is representing data from users within Demographic B, as represented by curve 441. Similarly to the example above, data 525 is distance 527 from curve 441 where it would intersect at intersection 526. Data 525 is distance 528 from intersection 529 with curve 405, at the millisecond level 530 indicated at the intersection. In this example, data 525 would be more likely or more probable from the demographic or individual data profile or probability distribution reference represented by curve 441, versus the probability distribution reference represented by curve 405. It will be appreciated by those of ordinary skill in the art that individual, global or demographic data may be represented by curve 405 and/or curve 441, with the numerous applications and combinations of applications contemplated by this invention.

Figure 16:
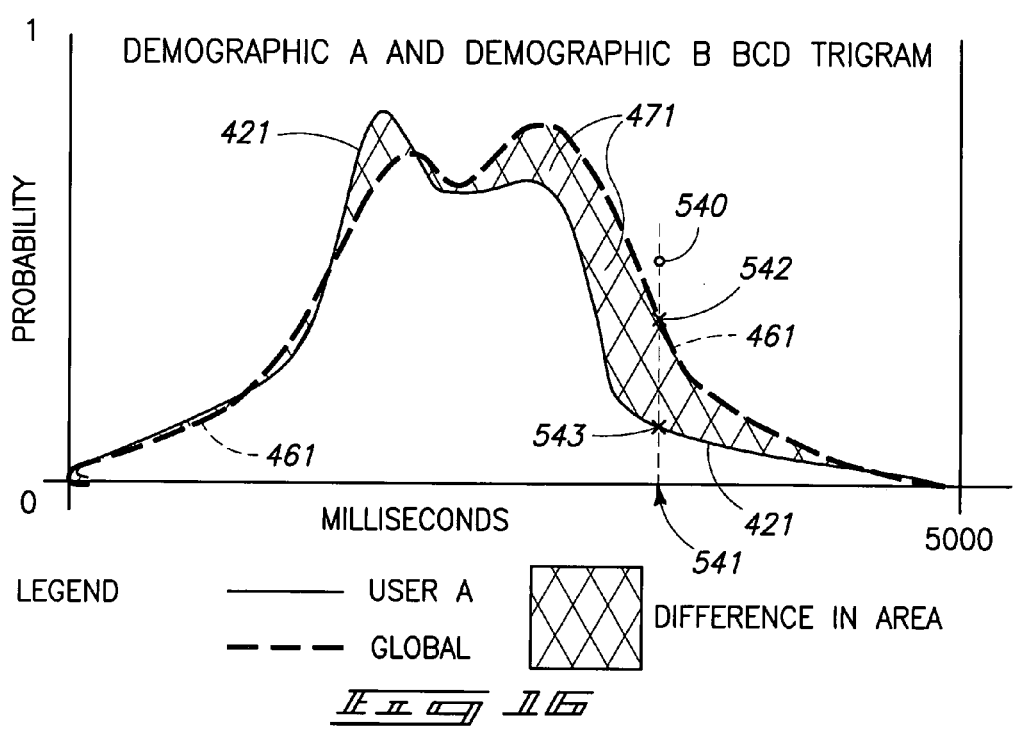
FIG. 16 is a graphic representation of the probability distribution representations illustrated in FIGS. 9 and 11 combined, with exemplary new data from a user of unknown demographics typing the keystrokes BCD.

FIG. 16 is the graphic representation of one embodiment of a probability distribution representation as illustrated in FIG. 13, and further wherein a couple exemplary data characteristics for users who may fall within Demographic A are applied into the probability distribution reference, to determine a probability as to whether the user probably belongs to Demographic A based on the new data representing the typing of the keystrokes BCD. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 16 shows data 540 above curve 461 and substantially above curve 421, where intersection 543 would tend to be expected at millisecond level 541. From the respective curves or probability distribution references it would be more probable in this instance that data 540 would be indicative of being within the curve 461 based on its intersection 542; and when comparing to both curve 421 and curve 461, whereas data 540 appears more probably indicative of the new data being indicative of a user within Demographic B.

Figure 17:
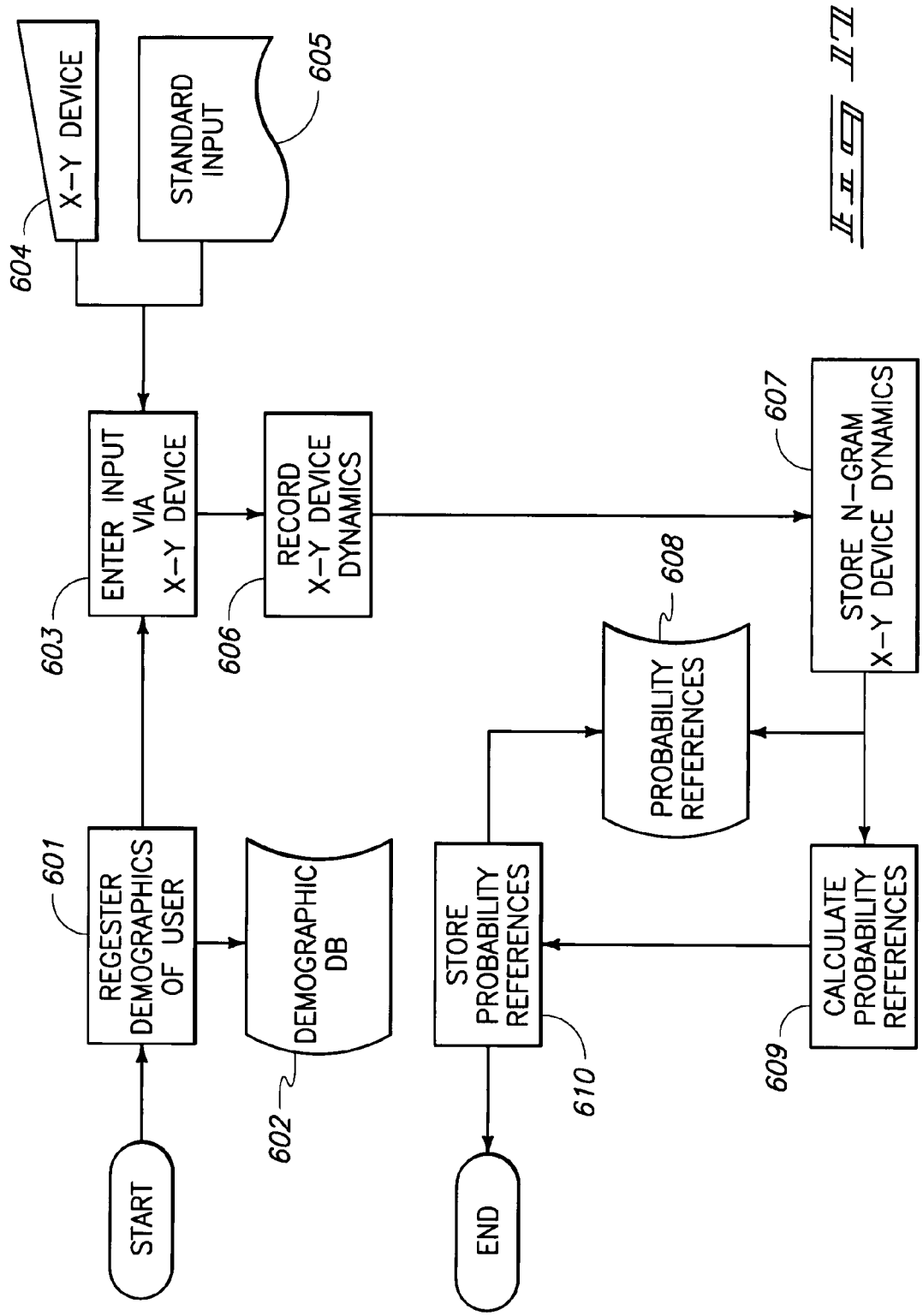
FIG. 17 is an exemplary flowchart of an embodiment of the invention illustrating a sequence to capture and map mouse dynamics to the demographic profiles.

FIG. 17 is an exemplary flowchart of an embodiment of the invention illustrating a sequence to capture and map mouse dynamics to the demographic profiles. FIG. 17 illustrates the process flow for capturing and mapping demographic elements to mouse dynamics. In a controlled environment, the system registers 601 user's demographic profile into the demographic database 602. The user enters 603 standard input 605 with the mouse 604. The system records the mouse dynamics 606 and stores the n-gram mouse measurements 607 into the probability distribution representation database 608. The user demographic probability distribution representation and the wide population or global probability distribution representation are updated 609 and the results may be stored into the probability distribution representation database 610.

Figure 18:
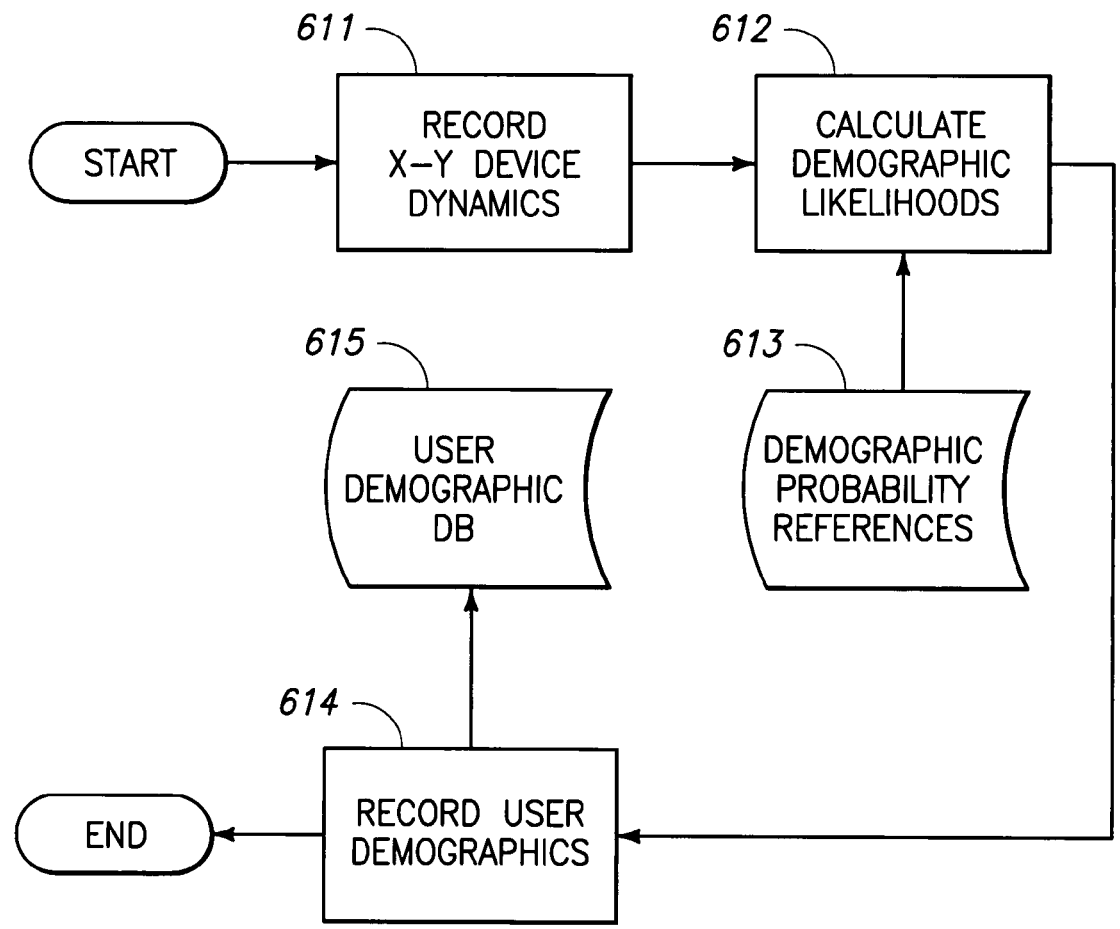
FIG. 18 is also an exemplary flowchart of an embodiment of the invention illustrating a sequence to capture and map mouse dynamics to the demographic profiles.

FIG. 18 is also an exemplary flowchart of an embodiment of the invention illustrating a sequence to capture and map mouse dynamics to the demographic profiles or probability distribution references. FIG. 18 illustrates the process flow for capturing new data of an anonymous user, or a user whose desired demographic data is not yet known. The system records the mouse dynamics of the anonymous user 611. From the probability distribution representations in the probability distribution representation database 613, the likelihood the mouse dynamics belong to certain demographic profiles is calculated 612. The user demographics are stored 614 into the user demographic database 615 to track the demographics of anonymous users entering the system.

Figure 19:
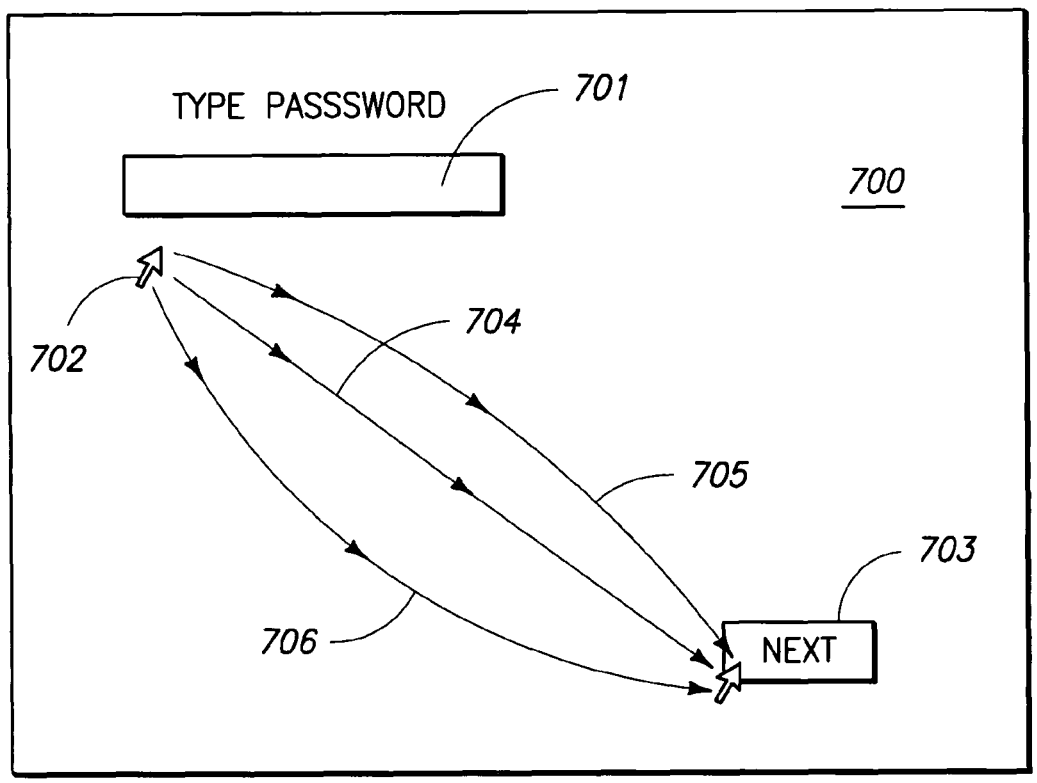
FIG. 19 is a representation of an exemplary computer screen or monitor display which requires that a user utilize an X-Y device movement dynamic and various measurements, data or characteristics which may be utilized therefrom.

FIG. 19 is a representation of an exemplary computer screen or monitor/display 700, which requires that a user utilize an X-Y device movement dynamic to move the mouse arrow from the type password box 701 to click the next box 703, all graphically represented on computer screen 700 while the movement of the pointer arrow is being accomplished on an X-Y device such as a touch pad, a computer mouse or other X-Y device. FIG. 19 illustrates pointer arrow 702 being moved from a location at or near type password box 701 to a point on or near next box 703. The straight-line path is indicated by line 704, with first alternative path 705 and second alternative path 706. The time it takes to move from the point illustrated at arrow 702 to the point where the arrow 702 is in the next box may also be measured, along with the specific trajectory line above or below the straight-line 704 between the two locations. Measurements or quantification of numerous dynamics may be utilized as data, particularly distinguishing data, to identify or authenticate the purported authorized user of the electronic system. Even the common resting point where a particular user such as an authorized user, would leave their touch pad device, may be an indicator or used as data to identify whether the purported authorized user is in fact the authorized user.

Figure 20:
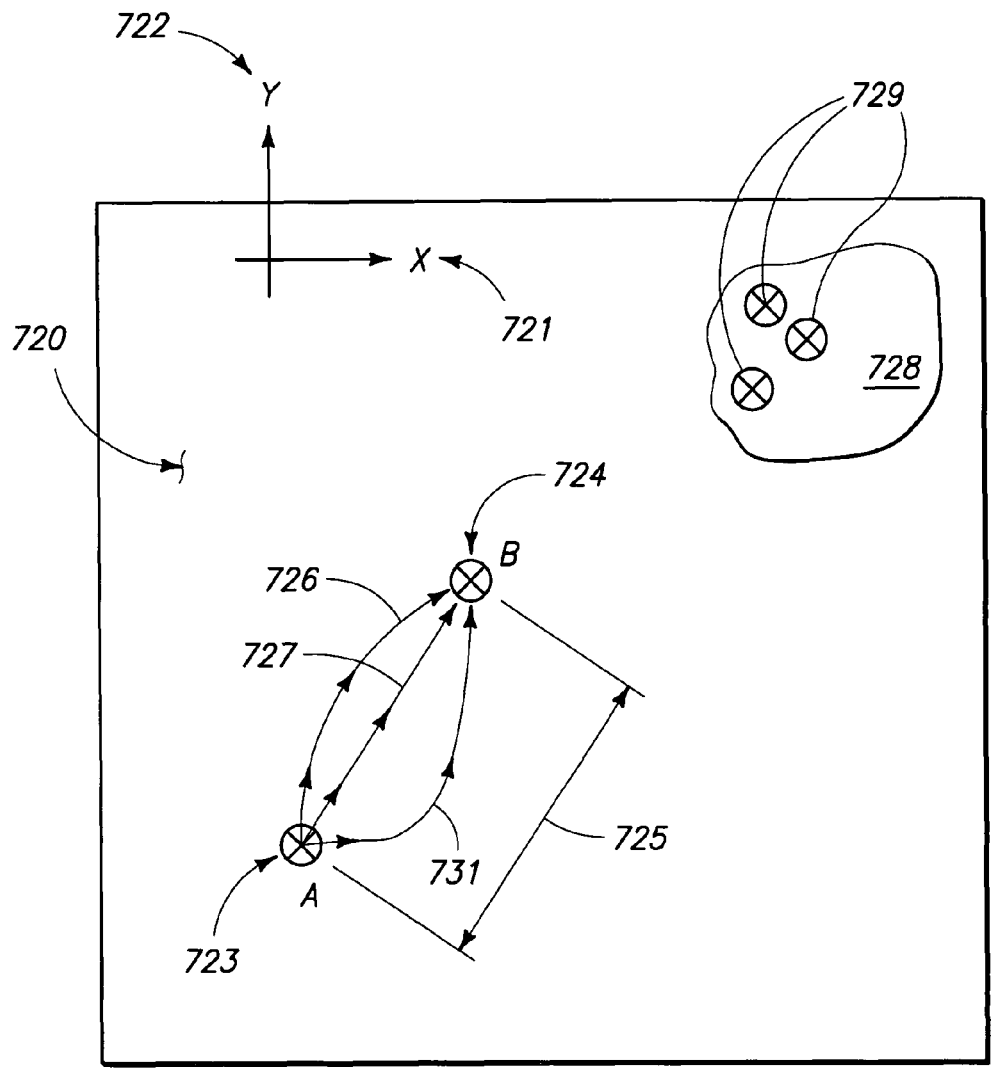
FIG. 20 is a schematic representation of an exemplary X-Y device movement dynamic and various measurements, data or characteristics which may be utilized therefrom.

FIG. 20 is a schematic representation of an exemplary X-Y device movement dynamic and various measurements. FIG. 20 illustrates an X-Y device 720 which may be any one of a number of different X-Y devices such as a mouse pad 720 or touch pad surface. FIG. 20 illustrates X-Y surface 720, X coordinate 721, and Y coordinate 722. FIG. 20 illustrates a potential movement on an X-Y surface 720 from point A 723 to point B 724. The straight-line path 727 is a distance represented by arrow 725, with first alternative upward trajectory path 726 and second alternative lower trajectory path 731. It will also be appreciated that data may not only include a time measurement in moving from point A to point B, but if the wide population or global profile is more towards trajectory path 726 and the authorized user is more apt to travel along trajectory path 731, then this may be good distinguishing data to distinguish an authorized user from the wide population or global pattern.

FIG. 20 also illustrates three points 729 in area 728 which may represent a common resting point for a mouse or other part of an X-Y device, and may be a distinguishing characteristic for an authorized user if the wide population or global probability is to rest the X-Y device in the lower left hand corner or the lower right-hand corner of the X-Y surface 720.

Figure 21:
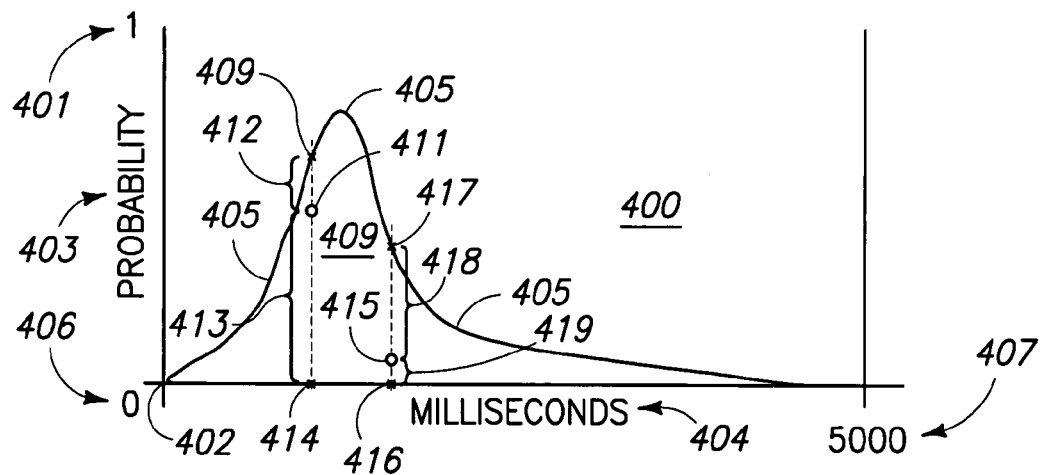
FIG. 21 is a graphic representation of the probability distribution representation illustrated in FIG. 8 for Demographic A, and with exemplary new data from a user of unknown demographics.

FIG. 21 is a graphic representation of one embodiment of a probability distribution representation for demographic A. FIG. 21 represents demographic A, which can be any demographic desired for association with users, such as age, sex, handedness, stress level, race, and any one of a number of others, all within the contemplation of this invention. In determining how to associate a probability that an anonymous or unidentified user is of a particular demographic, one can model the method and system depending on the facts and circumstances.

Figure 22:
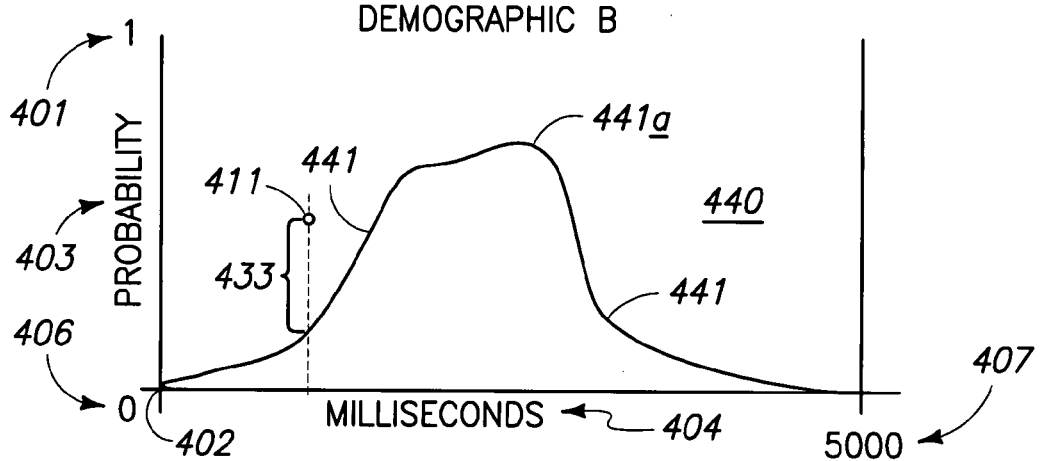
FIG. 22 is a graphic representation of the probability distribution representation illustrated in FIG. 10 for Demographic B, and with the same user new data shown in FIG. 21, from the user of unknown demographics.

For one example, if demographic A is for data representing all persons under the age of fifty, then a commercial entity may wish to use the probability distribution representation to determine if it is probable that a given user is over the age of fifty or under the age of fifty. Furthering the example by indicating that demographic B in FIG. 22 represents a wide population of all people over the age of fifty. By comparing the two curves 409 and 441 respectively, it appears that the probability distribution indicates that persons under the age of fifty move a computer mouse or type in keystroke combinations generally faster than demographic be in this example of people over the age of fifty. The probability distribution references in FIGS. 21 and 22 would therefore be a good basis or data point upon which to determine if an anonymous user is over or under the age of fifty.

FIG. 22 is a graphic representation of one embodiment of a probability distribution representation for Demographic B, wherein demographic B may be any one of a number of different demographics depending on the application. This invention contemplates that a first demographic distribution reference may be utilized in combination with the second demographic distribution reference, with one being the inverse of the other for that demographic, to do a comparison of the probabilities for higher accuracy. It may also be that a series of demographics may be utilized to associate multiple demographics with an anonymous, such as determining the sex, age, race or other demographics of a particular user. FIG. 22 shows new data 411 located relative to curve 421 such that it is a distance 433 from curve 421. In comparing the location of new data point 411 relative to the probability distribution reference in FIG. 21 compared to FIG. 22, it appears more probable that the user generating data point 411 is associated with Demographic A.

Once the desired demographics of the user are associated by the probability, then that information can be stored in databases and other computer or other systems to provide key demographic information about a universe or other identified group of users. It will also be appreciated by those of ordinary skill in the art that another way this invention may be utilized to associate a probability to a demographic to associate with the user, would be to construct a global or wide population demographic probability distribution reference against which a particular user may be compared, such as an overlay situation as discussed above in reference to other figures.

In another example as to how FIGS. 21 and 22 can be utilized in an application, the demographic sought after may be left-handed people, and so a probability distribution reference or probability tables such as illustrated in FIG. 21 may be constructed for left-handed people and similarly, a probability distribution reference for right-handed people may be constructed as illustrated in FIG. 22. Then on an ongoing basis, each new user or anonymous user's data may be sensed and compared first to the probability distribution reference for demographic A, i.e. left-handed people, and then compared to the probability distribution reference for demographic B, i.e. for right-handed people, to determine a probability that the new user or the anonymous user is left-handed. Continuing with the example, a calculation may then be made of the likelihood of the anonymous user being left-handed versus right-handed. A posterior probability can be established between the two and Bayes Rules or some other computational method may be utilized to determine a probability of left handedness or right handedness. Alternatively, the comparison of data of a new user or an anonymous user may be compared against a left-handed probability distribution reference and then against a wide population probability distribution reference to make the comparison as to the likelihood or probability that the anonymous users left-handed, according to calculation methods or probability assessments referred to above.

As will be appreciated by those of reasonable skill in the art, there are numerous embodiments to this invention, and variations of elements and components which may be used, all within the scope of this invention.

One embodiment of this invention for example is a method for associating a user of an electronic system with a demographic, comprising: accessing a data characteristic of a user of an electronic system; comparing the data characteristic of the user to a wide population probability distribution reference indicative of a demographic associated with the data characteristic; and determining a probability that the user is of the demographic based on the comparing.

In a further embodiment of that set forth in the preceding paragraph, a method is provided wherein the data characteristic is a first data characteristic of the user and the demographic is a first demographic, and further comprised of: accessing a second data characteristic of the user; comparing the second data characteristic of the user to a wide population probability distribution reference indicative of a second demographic associated with the second data characteristic; and determining a probability that the user is of the second demographic based on the comparing.

In a further embodiment of that set forth in the preceding paragraph, a method is provided including further: comparing the data characteristic of the user to a general wide population probability distribution reference; and determining a probability that the user is of the demographic based on the comparing of the data characteristic of the user to a wide population probability distribution reference indicative of a demographic associated with the data characteristic, and of the comparing of the data characteristic of the user to a general wide population probability distribution reference.

In the embodiments set forth above, there may be different types of devices to provide the data or care to risks which may be utilized by embodiments of this invention, and these embodiments contemplate exemplary situations such as wherein the data is one of a keystroke dynamic of the user and an X-Y device use dynamic of the user, or wherein the X-Y device use dynamic is one of a mouse use dynamic and a touch-pad use dynamic.

Embodiments of this invention may provide electronic systems of different types, such as a traditional communications network, a World Wide Web or Internet, and intranet communications system, or any one of a number of different systems, with no one in particular being required to practice this invention.

In other embodiments of this invention, it may become desirable to any one or more of a number of different data characteristics or data points from which to select the most distinctive identifier for the desired demographic based on the uniqueness of the probability distribution references. For instance, a method for determining a more probable data characteristic to identify a member of a demographic may be provided, comprised of: accessing a first wide population probability distribution reference indicative of a demographic associated with a first data characteristic; accessing a second wide population probability distribution reference indicative of the demographic associated with a second data characteristic; comparing the first wide population probability distribution reference indicative of the demographic associated with the first data characteristic, to a general wide population probability distribution reference for the first data characteristic; comparing the second wide population probability distribution reference indicative of the demographic associated with the second data characteristic, to a general wide population probability distribution reference for the second data characteristic; and determining which of the first data characteristic and the second data characteristic is a more probable identifier of the demographic based on the comparings. The foregoing embodiment may be provided further wherein the first data characteristic is one of a keystroke dynamic of the user and an X-Y device use dynamic of the user.

In other embodiments of this invention, a data processing apparatus to associate a user of an electronic system with a demographic may be provided, the data processing apparatus, comprising: a communication interface; storage circuitry including at least one wide population probability distribution reference indicative of a demographic associated with a first data characteristic; processing circuitry configured to access user data which includes the first data characteristic, and further configured to compare the user data to the at least one wide population probability distribution reference, and determining a probability that the user is of the demographic based on the comparing.

Embodiments of this system also may include a method of providing a scalable system for associating a user of an electronic system with a demographic, comprising: providing a wide population probability distribution reference indicative of a demographic associated with a data characteristic in storage circuitry; accessing the data characteristic of a user of an electronic system; comparing the data characteristic of the user to the wide population probability distribution reference; determining a probability that the user is of the demographic based on the comparing; and integrating updated data into the wide population probability distribution reference without increasing time required for comparing new data characteristics to the wide population probability distribution reference. In some of these embodiments: the wide population probability distribution reference is a probability table; and/or the data characteristic may be one of a keystroke dynamic of the user and an X-Y device use dynamic of the user.

It will be noted that because a probability distribution reference or a wide population probability distribution reference are utilized, and only one comparison needs to be made to that probability distribution reference with characteristic data of users, the speed of the comparing will not be diminished as a result of adding new data to train or further comprise the probability distribution reference. This feature makes embodiments of this invention very scalable and potentially on a near unlimited basis, without decreasing the speed of the comparings. Due to the nature of the wide population probability distribution reference, a very large number of new data points for a characteristic may be added to the global or wide population probability distribution reference without decreasing the speed because only one comparison needs to be made to test new or ongoing data against the wide population probability distribution reference on an ongoing or real-time basis. These additions or new data points for addition or integration into probability distribution references or wide population probability distribution references will be stored in storage circuitry. The speed of the updated probability distribution references will compare at the approximate same speed as the probability distribution references before being updated because a comparison is still being made against one such probability distribution reference, albeit an updated one with more data support.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A computerized method for associating a user of an electronic system with a demographic group by measuring behavioral dynamics in operating an input device, comprising:
   accessing a first data characteristic of a user of an electronic system measured performing a first prescribed interaction with an input device of the electronic system;
   accessing a probability distribution representation for a first demographic group representative of a plurality of individuals within the first demographic group performing the first prescribed interaction;
   accessing a probability distribution representation for a wide population to include a plurality of demographic groups performing the first prescribed interaction;
   determining a first posterior probability whether the user is a member of the first demographic group, by comparing (a) the data characteristic of the user, (b) the probability distribution representation for the first demographic group, and (c) the probability distribution representation for the wide population;
   accessing a second data characteristic of a user of an electronic system performing a second prescribed interaction with an input device of the electronic system;
   accessing a probability distribution representation for a first demographic group representative of a plurality of individuals within the first demographic group performing the second prescribed interaction; and
   accessing a probability distribution representation for a wide population to include a plurality of demographic groups performing the second prescribed interaction;
   determining a second posterior probability whether the user is a member of the first demographic group, by comparing (a) the data characteristic of the user, (b) the probability distribution representation for the first demographic group, and (c) the probability distribution representation for the wide population, with regard to the second prescribed interaction; and
   associating the user with the first demographic group, when a total posterior probability, based on the first posterior probability and the second posterior probability, is above a prescribed threshold.

2. The computerized method for associating a user of an electronic system with a demographic as recited in claim 1, wherein first data characteristic incorporates a plurality of instances of the user performing the first prescribed interaction, smoothed via kernel function.

3. The computerized method for associating a user of an electronic system with a demographic as recited in claim 1, wherein the input device is a keyboard or an X-Y device.

4. The computerized method for associating a user of an electronic system with a demographic as recited in claim 2, wherein the interaction is measured with regards to timing, acceleration, or velocity to perform the interaction with the input device.

5. The computerized method for associating a user of an electronic system with a demographic as recited in claim 1, further comprising:
   a first comparing, by comparing (a) the probability distribution representation for the first demographic group performing the first prescribed interaction to (b) the probability distribution representation for the wide population performing the first prescribed interaction;
   determining a first weighting value associated with the first prescribed interaction based on the first comparing;

a second comparing, by comparing (a) the probability distribution representation for the first demographic group performing the second prescribed interaction to (b) the probability distribution representation for the wide population performing the second prescribed interaction;

determining a second weighting value associated with the second prescribed interaction based on the second comparing;

determining a total posterior probability by associating the first weighting value with the first posterior probability and the second weighting value is associated with the second posterior probability.

6. The computerized method for associating a user of an electronic system with a demographic as recited in claim 1, wherein:

the probability distribution representation for the first demographic group performing the first prescribed interaction is based on a plurality of measurements of a plurality of members of the demographic group performing the first prescribed interaction, smoothed via a kernel function; and the probability distribution representation for the first demographic group performing the first prescribed interaction further accounts for parameters for time of day and type of application for the first prescribed interaction.

7. The computerized method for associating a user of an electronic system with a demographic as recited in claim 1, wherein the probability distribution representation for the demographic group is configured to capture time intervals for performing n-graph keyboard dynamics in a continuous manner while users interact with the system.

8. The computerized method for associating a user of an electronic system with a demographic as recited in claim 1, wherein the probability distribution representation for the wide population is scalable to represent users of a very large-scale electronic system.

9. A computerized method for associating a user of an electronic system with a demographic group by measuring behavioral dynamics in operating an input device, the method comprising:

capturing input behavioral data for a plurality of users to include a prescribed user, the input behavioral data related to measured interactions with input devices to include a keyboard and an X-Y device, in which the measured interactions include a first interaction and a second interaction;

maintaining a plurality of probability distribution representations for a wide population of users based on the captured data inclusive of the first interaction and the second interaction, in which each wide-population probability distribution representation for a wide population is associated to a single prescribed interaction;

maintaining a plurality of probability distribution representations for a plurality of demographic groups based on the captured data inclusive of the first interaction and the second interaction, in which each demographic probability distribution representation is associated to a single prescribed interaction for single demographic group;

determining a first probability whether the prescribed user is a member of a first demographic group, by comparing (a) input behavioral data associated with the current user performing the first interaction, (b) the probability distribution representation for the first demographic group performing the first interaction, and (c) the probability distribution representation for the wide population performing the first interaction;

determining a second probability whether the prescribed user is a member of a first demographic group, by comparing (a) input behavioral data associated with the current user performing the second interaction, (b) the probability distribution representation for the first demographic group performing the second interaction, and (c) the probability distribution representation for the wide population performing the second interaction; and associating the prescribed user with the first demographic group when the total probability, based on the first probability and the second probability, is above a prescribed threshold.

10. The computerized method for associating a user of an electronic system with a demographic as recited in claim 9, wherein the probability distribution representations for the wide population are scalable to represent users of a very large-scale electronic system.

11. The computerized method for associating a user of an electronic system with a demographic as recited in claim 9, wherein the probability distribution representation for the first demographic group performing the first interaction further accounts for parameters for time of day and type of application.

12. The computerized method for associating a user of an electronic system with a demographic as recited in claim 9, wherein the probability distribution representation for the first demographic group is configured to capture time intervals for performing n-graph keyboard dynamics in a continuous manner while users interact with the system.

13. A computerized method for associating a user of an electronic system with a demographic group by measuring behavioral dynamics in operating an input device, the method comprising:

capturing input behavioral data for a plurality of users to include a current user, the input behavioral data related to measured interactions with input devices to include a keyboard and an X-Y device, in which the measured interactions include a first interaction and a second interaction distinct from the first interaction;

maintaining a plurality of probability distribution representations for a wide population of users based on the captured data, in which each wide-population probability distribution representation for a wide population is associated to a single prescribed interaction to include an n-graph keystroke dynamic;

maintaining a plurality of probability distribution representations for a plurality of demographic groups based on the captured data, in which each demographic probability distribution representation is associated to a single prescribed interaction to include an n-graph keystroke dynamic for single demographic group;

determining a first probability whether the user is a member of the first demographic group, by comparing (a) input behavioral data associated with the current user performing the first interaction, (b) the probability distribution representation for the first demographic group performing the first interaction, and (c) the probability distribution representation for the wide population performing the first interaction;

determining a second probability whether the user is a member of the first demographic group, by comparing (a) input behavioral data associated with the current user performing the second interaction, (b) the probability distribution representation for the first demographic group performing the second interaction, and (c) the probability distribution representation for the wide population performing the second interaction;

determining a total probability based on the first probability and the second probability; and associating the current user with the first demographic group when the total probability is above a prescribed threshold.

14. The computerized method for associating a user of an electronic system with a demographic as recited in claim 13, wherein the probability distribution representation for the first demographic group performing the first interaction further accounts for parameters for time of day and type of application.

15. The computerized method for associating a user of an electronic system with a demographic as recited in claim 13, wherein the probability distribution representation for the first demographic group is configured to capture time intervals for performing n-graph keyboard dynamics in a continuous manner while users interact with the system.

16. A computerized method for associating a user of an electronic system with a demographic group by measuring behavioral dynamics in operating an input device, the method comprising:

capturing input behavioral data for a plurality of users to include a current user, the input behavioral data related to measured interactions with input devices to include a keyboard and an X-Y device, in which the measured interactions include a first interaction and a second interaction distinct from the first interaction;

maintaining a plurality of probability distribution representations for a wide population of users based on the captured data, in which each wide-population probability distribution representation for a wide population is associated to a single prescribed interaction to include an n-graph keystroke dynamic;

maintaining a plurality of probability distribution representations for a plurality of demographic groups based on the captured data, in which each demographic probability distribution representation is associated to a single prescribed interaction to include an n-graph keystroke dynamic for single demographic group;

a first comparing, by comparing (a) the probability distribution representation for a first demographic group performing the first interaction to (b) the probability distribution representation for the wide population performing the first interaction;

determining a first weighting value associated with the first interaction based on the first comparing;

a second comparing, by comparing (a) the probability distribution representation for the first demographic group performing the second interaction to (b) the probability distribution representation for the wide population performing the second interaction;

determining a second weighting value associated with the second interaction based on the second comparing;

determining a first probability whether the user is a member of the first demographic group, by comparing (a) input behavioral data associated with the current user performing the first interaction, (b) the probability distribution representation for the first demographic group performing the first interaction, and (c) the probability distribution representation for the wide population performing the first interaction;

determining a second probability whether the user is a member of the first demographic group, by comparing (a) input behavioral data associated with the current user performing the second interaction, (b) the probability distribution representation for the first demographic group performing the second interaction, and (c) the probability distribution representation for the wide population performing the second interaction;

determining a total probability by associating the first weighting value with the first probability and the second weighting value is associated with the second probability; and associating the current user with the first demographic group when the total probability is above a prescribed threshold.

17. The computerized method for associating a user of an electronic system with a demographic as recited in claim 16, wherein the probability distribution representation for the first demographic group performing the first interaction further accounts for parameters for time of day and type of application.

18. The computerized method for associating a user of an electronic system with a demographic as recited in claim 16, wherein the probability distribution representation for the first demographic group is configured to capture time intervals for performing n-graph keyboard dynamics in a continuous manner while users interact with the system.

* * * * *